(12) United States Patent
Stoltzfus

(10) Patent No.: US 12,146,568 B1
(45) Date of Patent: Nov. 19, 2024

(54) DRIVEN CLUTCH WITH DUAL HELIX ASSEMBLY FOR CONTINUOUSLY VARIABLE TRANSMISSION

(71) Applicant: The Hilliard Corporation, Elmira, NY (US)

(72) Inventor: Tyler Henssler Stoltzfus, Nichols, NY (US)

(73) Assignee: The Hilliard Corporation, Elmira, NY (US)

( * ) Notice: Subject to any disclaimer, the term of this patent is extended or adjusted under 35 U.S.C. 154(b) by 0 days.

(21) Appl. No.: 18/523,625

(22) Filed: Nov. 29, 2023

(51) Int. Cl.
*F16H 61/662* (2006.01)
*F16H 55/56* (2006.01)
*F16H 61/66* (2006.01)

(52) U.S. Cl.
CPC ....... *F16H 61/66272* (2013.01); *F16H 55/56* (2013.01); *F16H 2061/661* (2013.01)

(58) Field of Classification Search
CPC ............... F16H 55/56; F16H 2061/661; F16H 61/66272; F16H 63/067; F16H 9/18; F16H 61/6625; F16H 61/66227
USPC .......................................................... 474/19
See application file for complete search history.

(56) References Cited

U.S. PATENT DOCUMENTS

| | | | | |
|---|---|---|---|---|
| 3,722,308 A | * | 3/1973 | Steuer | F16H 55/56 474/46 |
| 4,378,221 A | * | 3/1983 | Huff | F16H 61/6625 192/111.1 |
| 4,523,917 A | * | 6/1985 | Schildt | F16H 61/6625 474/19 |
| 4,585,429 A | * | 4/1986 | Marier | F16H 61/66227 474/12 |
| 4,592,737 A | * | 6/1986 | Dhont | F16H 55/56 474/50 |
| 5,161,489 A | * | 11/1992 | Morooka | F02P 15/001 123/41 E |
| 5,720,681 A | * | 2/1998 | Benson | F16H 63/067 474/10 |
| 5,794,574 A | * | 8/1998 | Bostelmann | F02D 27/02 123/41 E |
| 6,039,010 A | * | 3/2000 | Hata | F01L 13/02 123/41 E |
| 6,120,399 A | * | 9/2000 | Okeson | F16H 55/56 474/14 |

(Continued)

*Primary Examiner* — Henry Y Liu
(74) *Attorney, Agent, or Firm* — Faegre Drinker Biddle & Reath LLP

(57) ABSTRACT

A driven clutch for a continuously variable transmission including a belt. The driven clutch includes a first sheave, a roller, a second sheave, an engine braking helix including an engine braking ramp, and an acceleration helix including an acceleration ramp. (1) When the belt applies torque to the first sheave and the second sheave in an acceleration direction, the acceleration helix is secured to and rotates together with the second sheave and the roller contacts the acceleration ramp to pinch the belt between the first sheave and the second sheave. (2) When the belt applies torque to the first sheave and the second sheave in an engine braking direction opposite the acceleration direction, the engine braking helix is secured to and rotates together with the second sheave and the roller contacts the engine braking ramp to pinch the belt between the first sheave and the second sheave.

20 Claims, 27 Drawing Sheets

(56) References Cited

U.S. PATENT DOCUMENTS

| | | | | |
|---|---|---|---|---|
| 6,149,540 | A * | 11/2000 | Johnson | F16H 61/66227 474/46 |
| 6,379,274 | B1 * | 4/2002 | Robert | F16H 61/66272 474/8 |
| 6,413,178 | B1 * | 7/2002 | Chamberland | F16H 63/067 474/12 |
| 6,569,043 | B2 * | 5/2003 | Younggren | F16H 55/56 474/19 |
| 6,743,129 | B1 * | 6/2004 | Younggren | F16H 55/56 474/19 |
| 6,860,826 | B1 * | 3/2005 | Johnson | F16H 55/56 474/14 |
| 6,953,400 | B2 * | 10/2005 | Kalies | F16H 55/56 474/19 |
| 6,958,025 | B2 * | 10/2005 | Huddleston | F16H 61/66272 474/8 |
| 6,994,643 | B2 * | 2/2006 | Kalies | F16H 61/66272 474/46 |
| 7,044,872 | B1 * | 5/2006 | Johnson | F16H 63/067 474/14 |
| 7,081,057 | B2 * | 7/2006 | Kalies | F16H 55/56 474/8 |
| 7,179,183 | B2 * | 2/2007 | Borghi | F16H 55/56 474/19 |
| 7,204,771 | B2 * | 4/2007 | Gu | F16H 9/18 474/19 |
| 7,674,197 | B2 * | 3/2010 | Aitcin | F16H 61/66272 474/10 |
| 7,901,308 | B2 * | 3/2011 | Binello | F16H 61/66272 474/10 |
| 7,927,241 | B2 * | 4/2011 | Labbe | F16H 55/56 474/10 |
| 8,012,050 | B2 * | 9/2011 | Aitcin | B60K 17/06 180/9.1 |
| 8,187,127 | B2 * | 5/2012 | Ishida | F16H 55/56 474/33 |
| 8,272,981 | B2 * | 9/2012 | Galletti | F16H 9/12 474/23 |
| 8,328,669 | B2 * | 12/2012 | Nouis | F16H 63/067 474/10 |
| 8,393,985 | B2 * | 3/2013 | Blanchard | F16H 61/66268 474/37 |
| 8,496,551 | B2 * | 7/2013 | Mueller | F16H 7/02 474/17 |
| 8,790,199 | B2 * | 7/2014 | Schoenfelder | F16H 55/56 474/12 |
| 8,894,520 | B2 * | 11/2014 | Labbe | F16H 55/56 474/19 |
| 9,005,058 | B2 * | 4/2015 | Ouchida | F16H 61/66272 474/19 |
| 9,228,644 | B2 * | 1/2016 | Tsukamoto | F16H 9/18 |
| 10,473,200 | B2 * | 11/2019 | Duan | F16H 3/54 |
| 10,473,213 | B2 * | 11/2019 | Huang | F16H 63/062 |
| RE47,798 | E * | 1/2020 | Tsukamoto | F16H 9/18 |
| 10,941,840 | B2 * | 3/2021 | Yao | F16H 9/18 |
| 11,306,809 | B2 * | 4/2022 | Aitcin | B62M 27/02 |
| 2004/0043848 | A1 * | 3/2004 | Nouis | F16H 63/067 474/19 |
| 2005/0096163 | A1 * | 5/2005 | Gu | F16H 9/16 474/10 |
| 2005/0209032 | A1 * | 9/2005 | Aitcin | F16H 55/56 474/19 |
| 2007/0105671 | A1 * | 5/2007 | Binello | F16H 55/56 474/19 |
| 2008/0096703 | A1 * | 4/2008 | Labbe | F16H 55/56 474/8 |
| 2009/0042678 | A1 * | 2/2009 | Labbe | F16H 55/56 474/19 |
| 2013/0005522 | A1 * | 1/2013 | Raasch | F02D 29/06 474/19 |
| 2013/0288833 | A1 * | 10/2013 | Mueller | F16H 63/067 474/19 |
| 2015/0024882 | A1 * | 1/2015 | Ochab | F16H 63/067 474/19 |
| 2018/0080529 | A1 * | 3/2018 | Yao | F16H 9/18 |
| 2019/0170231 | A1 * | 6/2019 | Duan | F16H 63/065 |
| 2019/0170249 | A1 * | 6/2019 | Huang | B60K 6/485 |

* cited by examiner

DRIVEN CLUTCH WITH DUAL HELIX ASSEMBLY FOR CONTINUOUSLY VARIABLE TRANSMISSION

FIELD OF THE INVENTION

The invention relates to a continuously variable transmission (CVT) for a vehicle and, more particularly, to a driven clutch for a CVT that provides efficient torque transfer for both acceleration and engine braking.

BACKGROUND OF THE INVENTION

Continuously variable transmissions (CVTs) are used in many types of vehicles, including off-road or all terrain vehicles, to alleviate any need for the driver to shift the transmission as the vehicle accelerates through its range of speeds. Typically the CVT is connected between an output shaft of a vehicle's engine and the driven components (for example, an axle). Like a conventional transmission, a CVT provides a gear reduction from the relatively high speed engine output shaft and the lower speed vehicle drive axle. The primary difference is that a CVT provides a continuously variable gear reduction based on commanded acceleration and deceleration.

A CVT may be used to drive an axle directly or, if desired, may be used in conjunction with an additional gear box/transmission. For example, on all terrain vehicles (ATVs) it is desirable to provide a gear box to permit the driver to shift between forward and reverse gears. In such transmissions, a neutral position may also be provided, along with, for example, an optional low gear for extra power at low speeds. Typically such a gear box is connected to the output shaft of the CVT. The gear box, in turn, has an output connected by suitable linkages to the drive axle (or axles) of the vehicle. The year box or transmission may also be used to provide further gear reduction in addition to the reduction provided by the CVT. Also, additional drive train components, such as differentials, may be incorporated between the CVT and the drive axle(s).

Typically a CVT includes a split sheave primary drive clutch connected to the output of the vehicle engine and a split sheave secondary or driven clutch connected (often through additional drive train linkages) to the vehicle axle. An endless, flexible, generally V-shaped drive belt is disposed about the clutches and provides for the transmission of torque between the two clutches. Each of the clutches has a pair of complementary sheaves with one of the sheaves being laterally movable with respect to the other. The effective gear ratio of the transmission is determined by the position of the movable sheave relative to the other sheave in each of the clutches (which varies the position of the belt on the clutches).

The primary drive clutch has its sheaves normally biased apart, typically by a coil spring, so that when the engine is idling the drive belt does not effectively engage the sheaves. As a result, essentially no driving force is transmitted from the primary drive clutch to the secondary driven clutch. The secondary driven clutch has its sheaves normally biased together, typically by a torsion spring working in combination with a helix-type cam, as described below. As a result, when the engine is at idle, the drive belt rides near the outer perimeter of the secondary driven clutch sheaves.

The spacing of the sheaves in the primary drive clutch usually is controlled by centrifugal flyweights. As the drive clutch rotates faster (in response to increased engine RPM) the flyweights urge the movable sheave toward the stationary sheave. This pinches the drive belt, causing the belt to begin rotating with the drive clutch. The belt, in turn, transmits torque to the driven clutch, causing it to rotate. Further movement of the drive clutch's movable sheave toward the stationary sheave causes the belt to climb radially outward on the drive clutch sheaves, increasing the effective diameter of the drive belt path around the drive clutch. Thus, the spacing of the sheaves in the drive clutch changes based on engine RPM. The drive clutch is, therefore, primarily speed sensitive.

As the sheaves of the drive clutch pinch the drive belt and force the belt to climb outwardly on the drive clutch sheaves, the belt (not being stretchable) is pulled inwardly between the sheaves of the driven clutch, decreasing the effective diameter of the drive belt path around the driven clutch. This movement of the belt outwardly and inwardly on the drive and driven clutches smoothly changes the effective gear ratio of the transmission in infinitely variable increments.

Although a coil spring could be used to bias the sheaves of the driven clutch together, typically a torque-sensitive system is used to pinch the belt harder as more torque is conveyed by the drive belt to the driven clutch. A generally cylindrical cam with, for example, three cam surfaces (often called ramps) on one end is secured to the output shaft of the driven clutch. Because the ramps are generally helical in shape, the cam is often referred to as a helix. A set of a corresponding number of cam followers—typically buttons or rollers—is mounted to the movable sheave.

The movable sheave is disposed about the output shaft so that it is free to move laterally and rotatably with respect to the shaft. The buttons or rollers are located on the movable sheave at positions that permit contact with the ramps of the helix. A torsion spring is typically used to urge the movable sheave rotationally and laterally such that the rollers are engaged against their respective helix ramps. The acceleration ramp of the helix, which is configured (angled) so as to restrict or control upshifting, operates in combination with the spring to determine the upshifting characteristics of the clutch.

As torque is transmitted by the drive belt to the driven clutch sheaves, the belt tends to urge the movable sheave laterally away from the stationary sheave, while at the same time rotating the movable sheave with respect to the output shaft. However, the torsion spring urges the buttons against the acceleration ramps, thus engaging the movable sheave with the helix. As torque is applied by the belt to the movable sheave, the slope of the ramp causes the buttons to slide on the ramps toward the stationary sheave, pushing the movable sheave towards the stationary sheave. Thus, the helix converts the torque applied by the drive belt to a force that pinches the sheaves together, providing good frictional contact between the sheaves and the drive belt. The more torque applied by the belt to the driven clutch, the harder the sheaves of the driven clutch pinch the belt, thereby preventing the belt from slipping, while at the same time producing downshifting of the transmission (i.e., urging the belt outwardly between the sheaves of the driven clutch, which urges the belt to move inwardly between the sheaves of the drive clutch). Thus, the spacing of the sheaves in the driven clutch changes based on torque. The driven clutch is, therefore, primarily torque sensitive.

The actual position of the belt within the sheaves of the drive and driven clutches is determined by the balance of the forces acting on the movable sheaves in the two clutches. In the drive clutch, these forces consist of the coil spring urging the sheaves apart and the speed-dependent force of the centrifugal flyweights which urge the sheaves together. In the driven clutch, these forces include the torque-dependent force generated by the rollers/buttons sliding up the helix ramps toward the stationary sheave and the torsion spring urging the rollers/buttons into contact with the helix.

Because a CVT automatically adjusts based on speed and torque, the balance of forces can be disrupted relatively easily in variable operating conditions. For example, when the vehicle is traveling along at a given speed and then the operator momentarily lets off on the throttle, the balance of forces changes, causing the system to momentarily shift out of the desired ratio. When the operator reapplies the throttle, torque is restored to the driven clutch, but the transmission is no longer in its optimal gear ratio, requiring the system to readjust. Similarly, if the drive wheels momentarily leave the ground but the operator does not let off on the throttle, the load on the drive wheels is reduced, again disrupting the balance of forces within the CVT and causing it to temporarily shift out of the existing gear ratio. When load is restored to the drive wheels, the CVT must again readjust to the proper gear ratio.

In situations where the CVT must quickly downshift or upshift to return to a proper or desired gear ratio, the belt must move outwardly or inwardly between the sheaves of the driven clutch. This belt movement may be inhibited by the need of the movable sheave to rotate with respect to the stationary sheave as the rollers/buttons travel along the helix ramp. Consequently, as one sheave rotates with respect to the other, it scrubs the sides of the drive belt producing frictional forces which inhibit smooth and quick shifting of the CVT.

In some types of vehicle drive trains when the vehicle is traveling along at a given speed and then the throttle is dropped to an idle speed, the rotation of the drive wheels of the vehicle will back drive the drive train, causing the engine to rotate at a speed greater than it would based on throttle position. As such, the inherent frictional forces present throughout the drive train, including particularly the compression forces present in the engine cylinders, tend to slow the vehicle down. This condition is commonly referred to as engine braking, and is particularly beneficial in off-road vehicles. The degree of engine braking provided is dependent on the gear ratio of the transmission. That is, higher gears produce less braking while lower gears produce more braking. Conventional CVTs, because of their dynamic operation, do not provide significant engine braking.

In a CVT, loss of the force balance between the drive and driven clutches when the rider lets off on the throttle including, in particular, the loss of the torque-induced pinching force by the helix on the belt, reduces the engine-braking potential of the CVT. Furthermore, conventional CVT systems do not provide engine braking when the engine speed is at idle since the sheaves on the drive clutch are biased apart by a coil spring thus, not engaging the drive belt. More specifically, in order to prevent the vehicle from "creeping" while in idle, the drive belt usually has a small amount of slack in the idle position to prevent the input shaft of the drive clutch from imparting any rotation to the drive belt. However, the slack in the drive belt prevents the driven clutch from back driving the engine through the drive clutch when in the idle position.

An improved CVT is disclosed in U.S. Pat. No. 6,149,540. In that CVT, a roller clutch is mounted in both the drive and the driven clutches. The clutches and drive belt are configured so that when the engine is idling the belt firmly engages a drive surface of the roller clutch that is connected to the drive clutch. The roller clutch permits the drive surface and, thus, the belt to remain stationary when the input shaft is rotating, thereby preventing vehicle "creep" when idling. The roller clutch also is designed to firmly engage the drive clutch's drive surface with the input shaft when the driven clutch attempts to drive the belt faster than the speed at which the drive clutch and input shaft are rotating. This permits the driven clutch to back drive the input shaft and provide engine braking.

In order for the CVT of U.S. Pat. No. 6,149,540 to provide the necessary engine braking, the helix is allowed to rotate relative to the sheaves by means of the overrunning clutch, thus, overcoming the friction that exists between the sheaves and the belt.

While U.S. Pat. No. 6,149,540 provides an improved CVT that works well in general, it is rather costly to manufacture and, thus, limited to use in more expensive vehicles. Furthermore, the roller clutch in the driven clutch is configured so as to only transmit torque in one direction (that is, during acceleration).

As discussed above, driven clutches in CVTs include a helix cam. In some cases, the helix cam includes a first ramp that the roller/button contacts during acceleration and an adjacent second ramp that the roller/button contacts during engine braking. The first ramp and the second ramp are typically spaced apart to inhibit the roller/button from binding up in the helix cam, but this spacing can lead to unsmooth transitions from acceleration to engine braking and vice versa.

A need, therefore, exists for an improved CVTs that provide smoother operation.

SUMMARY OF THE INVENTION

In one aspect, the present invention provides a driven clutch for a continuously variable transmission including a belt. The driven clutch includes a first sheave configured to rotate together with a shaft about a sheave axis. A roller is coupled to and is rotatable relative to the first sheave. A second sheave is coupled to the first sheave, and the second sheave is translatable and rotatable relative to the first sheave. An engine braking helix is coupled to the second sheave, and the engine braking helix includes an engine braking ramp extending helically in a first ramp direction relative to the sheave axis. An acceleration helix is coupled to the second sheave and configured to be rotated relative to the engine braking helix. The acceleration helix includes an acceleration ramp extending helically in a second ramp direction to the sheave axis, and the second ramp direction is opposite the first ramp direction. (1) When the belt applies torque to the first sheave and the second sheave in an acceleration direction, the acceleration helix is secured to and rotates together with the second sheave and the roller contacts the acceleration ramp to pinch the belt between the first sheave and the second sheave. (2) When the belt applies torque to the first sheave and the second sheave in an engine braking direction opposite the acceleration direction, the engine braking helix is secured to and rotates together with the second sheave and the roller contacts the engine braking ramp to pinch the belt between the first sheave and the second sheave.

In some embodiments, (1) when the belt applies torque to the first sheave and the second sheave in the acceleration direction, the engine braking helix is rotatable relative to the second sheave, and (2) when the belt applies torque to the first sheave and the second sheave in the engine braking direction, the acceleration helix is rotatable relative to and the second sheave.

In some embodiments, the second sheave includes a movable hub, the engine braking helix is disposed radially outwardly from the movable hub, and the acceleration helix is disposed radially outwardly from the engine braking helix.

In some embodiments, the driven clutch further includes an acceleration lock ring, and when the belt applies torque to the first sheave and the second sheave in the acceleration direction the acceleration lock ring secures the acceleration helix to the second sheave.

In some embodiments, the acceleration lock ring includes a first plurality of acceleration teeth, the acceleration helix includes a second plurality of acceleration teeth, and when the belt applies torque to the first sheave and the second sheave in the acceleration direction the first plurality of acceleration teeth interdigitate with the second plurality of acceleration teeth to secure the acceleration helix to the second sheave.

In some embodiments, the second sheave includes at least one protrusion and the acceleration lock ring includes at least one groove, and when the belt applies torque to the first sheave and the second sheave in the acceleration direction the protrusion wedges against the acceleration lock ring in the groove to secure the acceleration helix to the second sheave.

In some embodiments, the driven clutch further includes at least one spring urging the acceleration lock ring to contact the acceleration helix.

In some embodiments, the driven clutch further includes an engine braking lock ring, when the belt applies torque to the first sheave and the second sheave in the engine braking direction the engine braking lock ring secures the engine braking helix to the second sheave.

In some embodiments, the driven clutch further includes an engine braking lock ring, when the belt applies torque to the first sheave and the second sheave in the engine braking direction the engine braking lock ring secures the engine braking helix to the second sheave.

In some embodiments, the engine braking lock ring includes a first plurality of engine braking teeth, the engine braking helix includes a second plurality of engine braking teeth, and when the belt applies torque to the first sheave and the second sheave in the engine braking direction the first plurality of engine braking teeth interdigitate with the second plurality of engine braking teeth to secure the engine braking helix to the second sheave.

In some embodiments, the second sheave includes at least one protrusion and the engine braking lock ring includes at least one groove, and when the belt applies torque to the first sheave and the second sheave in the engine braking direction the protrusion wedges against the engine braking lock ring in the groove to secure the engine braking helix to the second sheave.

In some embodiments, the driven clutch further includes at least one spring urging the engine braking lock ring to contact the engine braking helix.

In one aspect, the present invention provides a driven clutch for a continuously variable transmission. The driven clutch includes a first sheave configured to rotate together with a shaft about a sheave axis. A roller is coupled to the first sheave, and the roller is rotatable relative to the first sheave about a roller axis. A second sheave is coupled to the first sheave, the second sheave is translatable relative to the first sheave along the sheave axis, and the second sheave is rotatable relative to the first sheave about the sheave axis. An engine braking helix is coupled to the second sheave, and the engine braking helix includes an engine braking ramp extending helically in a first ramp direction relative to the sheave axis. An acceleration helix is coupled to the second sheave and configured to be rotated relative to the engine braking helix. The acceleration helix includes an acceleration ramp extending helically in a second ramp direction relative to the sheave axis, and the second ramp direction is opposite the first ramp direction. (1) When torque is applied to the first sheave and the second sheave in an acceleration direction, the acceleration helix is secured to and rotates together with the second sheave and the roller contacts the acceleration ramp to urge the second sheave toward the first sheave, and (2) when torque is applied to the first sheave and the second sheave in an engine braking direction opposite the acceleration direction, the engine braking helix is secured to and rotates together with the second sheave and the roller contacts the engine braking ramp to urge the second sheave toward the first sheave.

In some embodiments, (1) when torque is applied to the first sheave and the second sheave in the acceleration direction, the engine braking helix is rotatable relative to the second sheave, and (2) when torque is applied to the first sheave and the second sheave in the engine braking direction, the acceleration helix is rotatable relative to the second sheave.

In some embodiments, the second sheave further includes a movable hub, the engine braking helix is disposed radially outwardly from the movable hub, and the acceleration helix is disposed radially outwardly from the engine braking helix.

In some embodiments, the driven clutch further includes an acceleration lock ring, and when torque is applied to the first sheave and the second sheave in the acceleration direction the acceleration lock ring secures the acceleration helix to the second sheave.

In some embodiments, the driven clutch further includes an engine braking lock ring, and when torque is applied to the first sheave and the second sheave in the engine braking direction the engine braking lock ring secures the engine braking helix to the second sheave.

In some embodiments, the engine braking lock ring is rotatable together with the acceleration lock ring about the sheave axis.

In some embodiments, the driven clutch further includes an engine braking lock ring, and when torque is applied to the first sheave and the second sheave in the engine braking direction the engine braking lock ring secures the engine braking helix to the second sheave.

In one aspect, the present invention provides a driven clutch for a continuously variable transmission. The driven clutch includes a first sheave configured rotate together with a shaft about a sheave axis. A second sheave is coupled to the first sheave, and the second sheave is translatable and rotatable relative to the first sheave. A drive protrusion is coupled to the second sheave. A first helix is coupled to the second sheave, and the first helix includes a first ramp extending helically in a first ramp direction relative to the sheave axis. A second helix is coupled to the second sheave and configured to be rotated relative to the first helix, the second helix includes a second ramp extending helically in a second ramp direction relative to the sheave axis, the second ramp direction is opposite the first ramp direction. (1) When torque is applied to the first sheave and the second sheave in a first torque direction, the drive protrusion secures the first helix to the second sheave and causes the first helix to rotate together with the second sheave, and the second helix is rotatable relative to the second sheave, and (2) when torque is applied to the first sheave and the second sheave in a second torque direction opposite the first torque direction, the drive protrusion secures the second helix to the second sheave and causes the second helix to rotate together with the second sheave, and the first helix is rotatable relative to the second sheave.

BRIEF DESCRIPTION OF THE DRAWINGS

For the purpose of illustrating the invention, the drawings show a form of the invention which is presently preferred. However, it should be understood that this invention is not limited to the precise arrangements and instrumentalities shown in the drawings.

DESCRIPTION OF THE DRAWINGS

Figure 1:
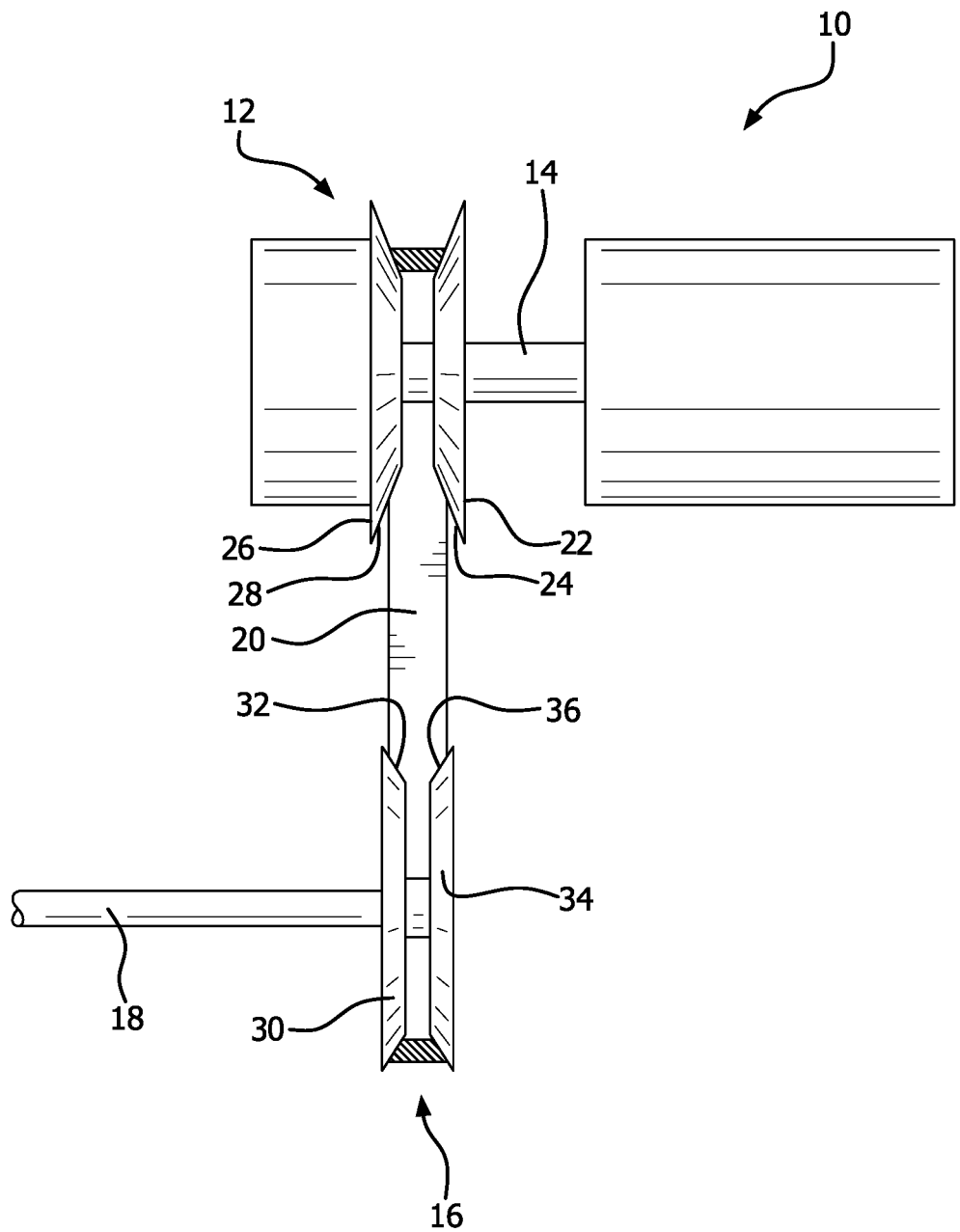
FIG. 1 is a schematic representation of a continuously variable transmission (CVT) including a driven clutch according to an embodiment of the present invention.

Referring to the drawings, wherein like reference numerals illustrate corresponding or similar elements throughout the several views, FIG. 1 depicts an embodiment of a continuously variable transmission (CVT) 10 employing an improved driven clutch according to an embodiment of the present invention. While the details of the invention are described with reference to this particular type of CVT, it will be understood that variations in the structure and components of the basic CVT may be made while still employing the substance of the invention.

The preferred system shown in the drawings includes a split sheave primary drive clutch 12 mounted to a rotatable input shaft 14 (which typically is connected directly to the vehicle's engine or an engine output shaft.) A split sheave secondary driven clutch 16 is mounted to a rotatable driven shaft 18 (which, as described above, is typically connected to additional drive train components, such as a gear box, and ultimately to the drive axle(s) and wheels of the vehicle). An endless, preferably generally V-shaped (for example, trapezoid shaped) flexible drive belt 20 is disposed around the two clutches 12, 16. The CVT 10 in FIG. 1 is shown in its idle position. That is, the drive belt 20 is positioned near the center of the drive clutch 12 and near the periphery of the driven clutch 16.

The drive clutch 12 in the illustrated embodiment is preferably a conventional split sheave primary drive clutch and, thus, its components are only generally illustrated in the figures. The drive clutch 12 includes a laterally stationary sheave 26 having an inner belt-engaging surface 28, a laterally movable sheave 22 having a complementary inner belt-engaging surface 24, and a coil spring (not shown) for normally biasing the movable sheave 22 away from the stationary sheave 26. The belt-engaging surfaces 24, 28 of the sheaves 22, 26 are tapered so that together they form generally the shape of a V with the angle of the V generally matching the V-shaped angle of the drive belt 20. Any conventional drive clutch with an engine braking feature can be used with the present invention.

Figure 2:
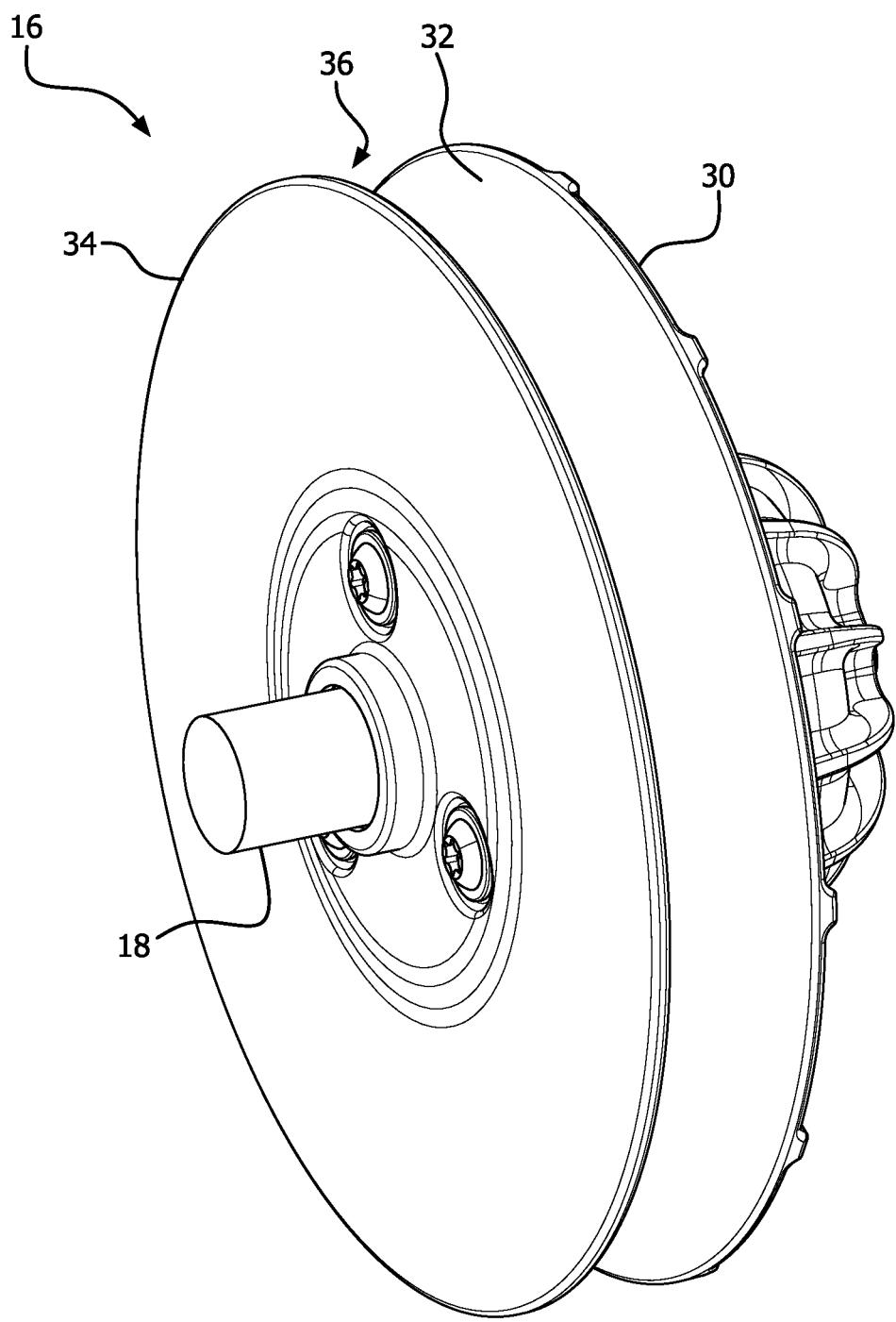
FIG. 2 is a perspective view of the driven clutch of the CVT of FIG. 1.

With continued reference to FIG. 1 and additional reference to FIG. 2, the driven clutch 16 generally includes a first, or stationary (axially relative to the shaft 18), sheave 34 having an inner belt-engaging surface 36, and a second, or movable (axially relative to the shaft 18), sheave 30 having a complementary inner belt-engaging surface 32. The belt-engaging surfaces 32, 36 of the sheaves 30, 34 are tapered so that together they form generally the shape of a V with the angle of the V generally matching the V-shaped angle of the drive belt 20 (FIG. 1). Further details and components of the driven clutch are provided below.

Figure 3:
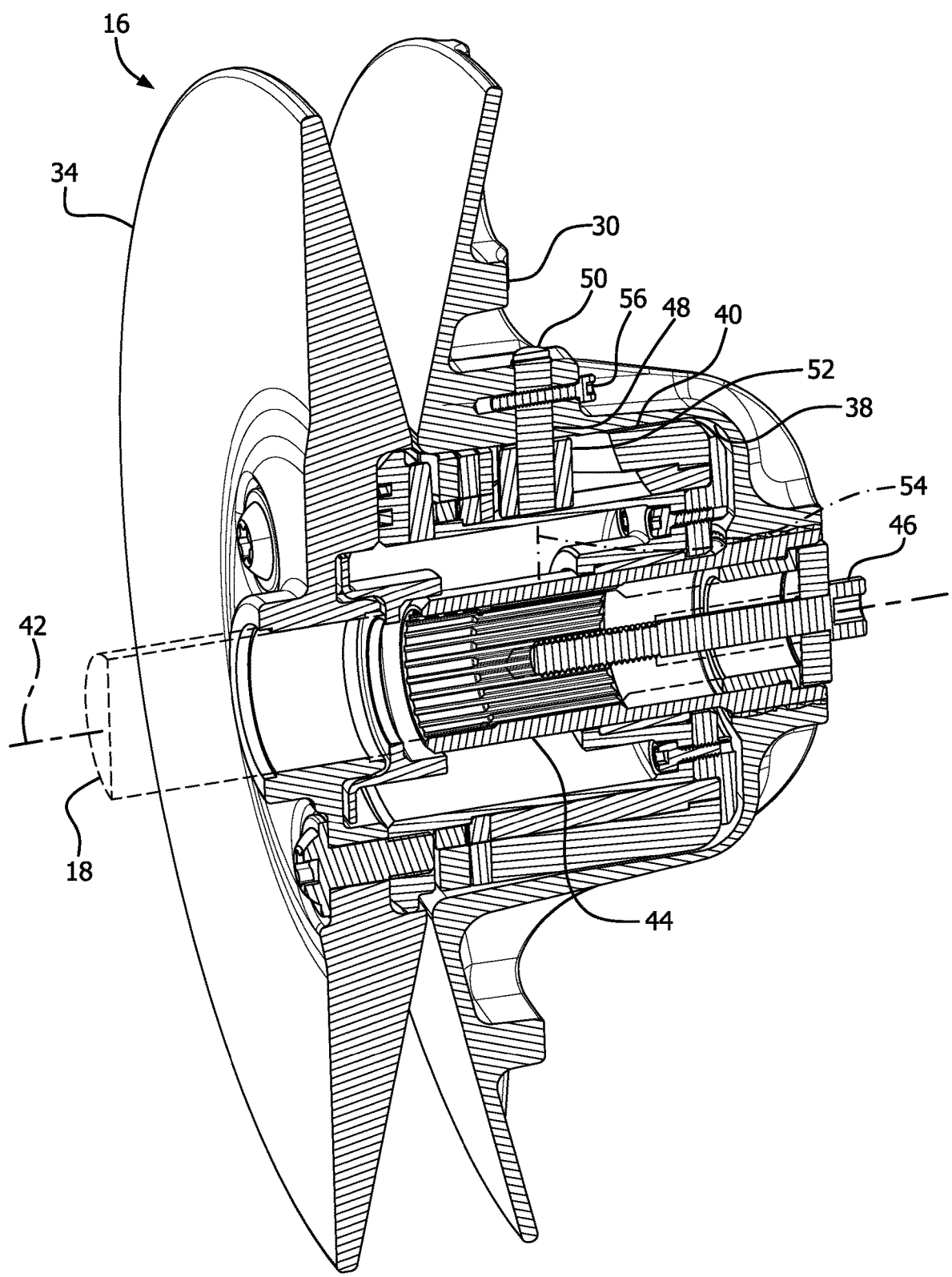
FIG. 3 is a perspective sectional view of the driven clutch along line 3-3 of FIG. 2.
Figure 4:
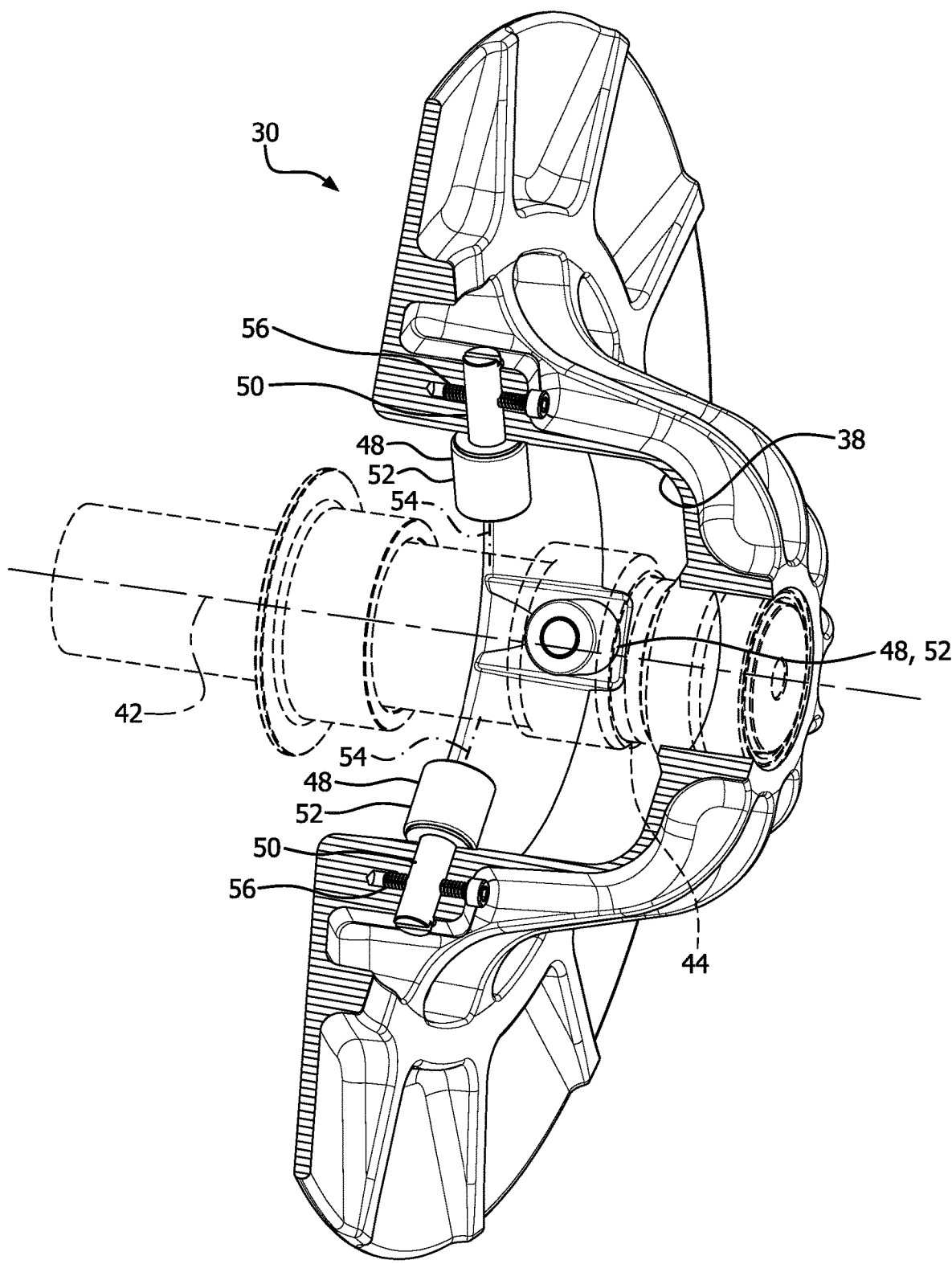
FIG. 4 is a perspective partial sectional view of a first, or laterally stationary, sheave and roller assemblies of the driven clutch of FIG. 2, the roller assemblies not being sectioned.

FIGS. 3-19 depict further details of the driven clutch 16. Referring specifically to FIG. 3, the first sheave 30 includes an internal cavity 38 that receives at least partially or part of the second sheave 34, the driven shaft 18, and a helix assembly 40. The helix assembly 40 controls upshifting of the clutch 16 and, as described in further detail below, urges the second sheave 34 toward the first sheave 30 when torque is applied to the clutch 16 and thereby pinches or compresses the belt 20 (shown elsewhere) between the sheaves 30, 34.

The first sheave 30 couples to and rotates together with the driven shaft 18 about a sheave axis 42, which may be substantially parallel to the longitudinal axis of the driven shaft 18. Illustratively and referring to FIGS. 3 and 4, the first sheave 30 couples to the driven shaft 18 (FIG. 3) via a coupling 44 disposed within the internal cavity 38 and one or more fasteners 46 (FIG. 3). The coupling 44 may be, for example, a spline coupling (as illustrated), a keyed coupling, a D-shaft, double-D shaft, or the like. The first sheave 30 also couples to one or more roller assemblies 48 (not sectioned in FIG. 4), illustratively three roller assemblies 48, disposed within the internal cavity 38. Illustratively, each roller assembly 48 includes a pin 50 that couples to a roller 52, and the roller 52 rotates relative the pin 50 about a roller axis 54. Each roller axis 54 may be substantially perpendicular to the sheave axis 42 of the clutch 16. Illustratively, the pin 50 of each roller assembly 48 is fixedly coupled to the first sheave 30 via a fastener 56. Illustratively, the roller assemblies 48 are offset from each other by equal angles around the sheave axis 42. In other embodiments, the roller assemblies 48 may have different features and/or arrangements. For example, in some embodiments the pin 50 may be monolithically coupled to, or integrally formed with, the first sheave 30. As another example, in some embodiments the roller assemblies 48 may be offset from each other by unequal angles around the sheave axis 42.

Figure 5:
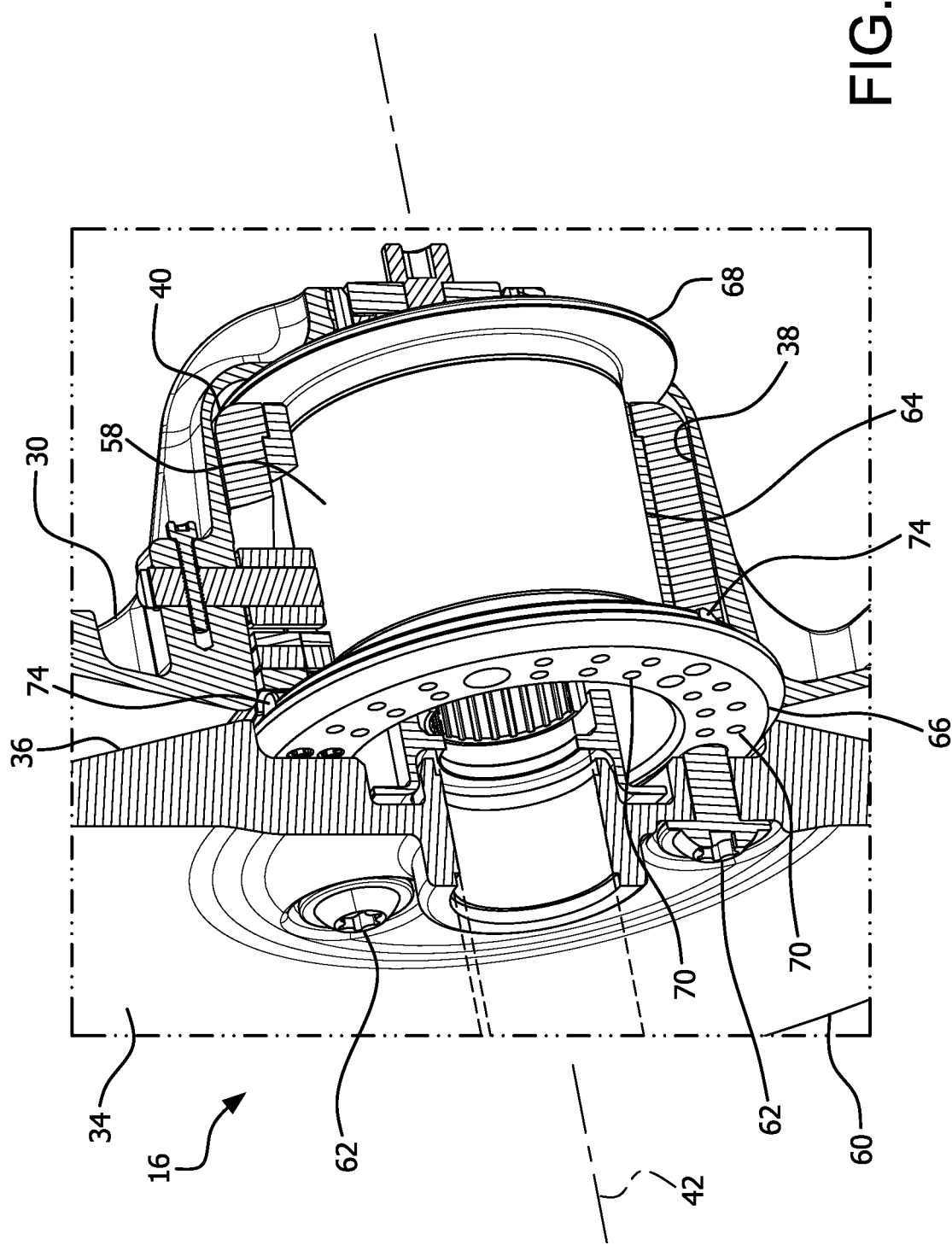
FIG. 5 is a detail perspective partial sectional view of the driven clutch of FIG. 2 with a movable hub of a second, or movable, sheave not being sectioned.
Figure 6:
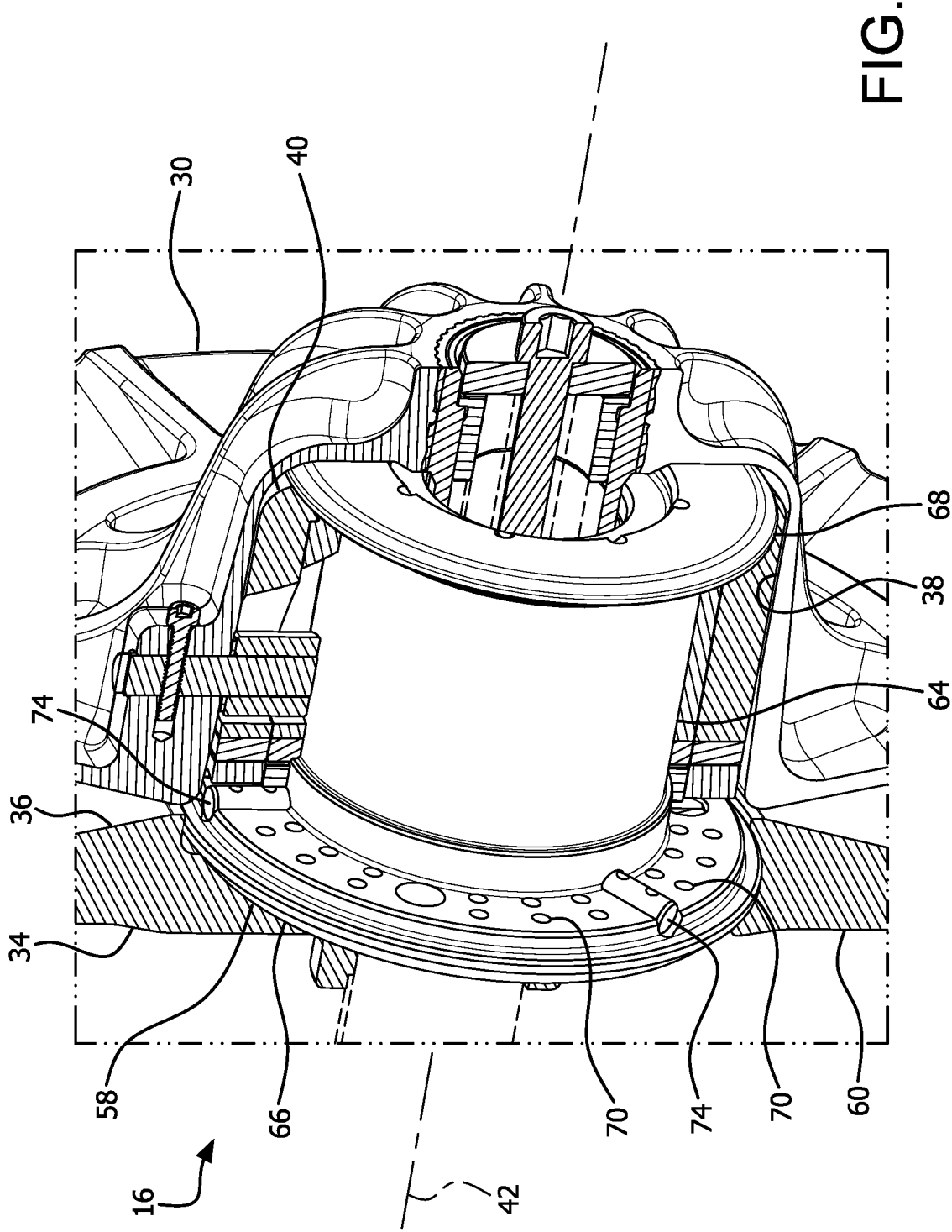
FIG. 6 is another detail perspective partial sectional view of the driven clutch of FIG. 2 with the movable hub of the second sheave not being sectioned.
Figure 7:
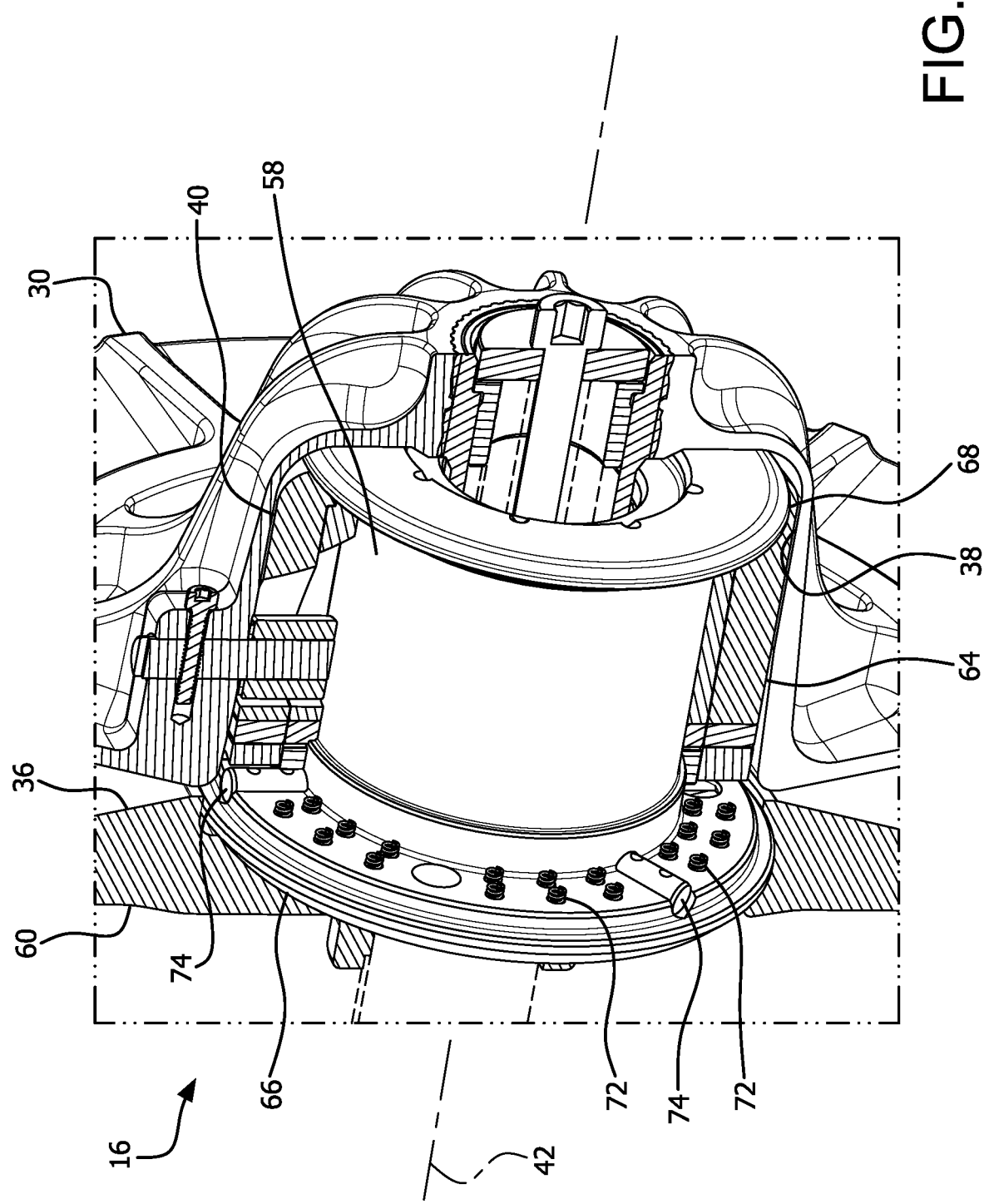
FIG. 7 is yet another detail perspective partial sectional view of the driven clutch of FIG. 2 and further illustrating springs coupled to the second sheave.

FIGS. 5-8 further depict the driven clutch 16, with a movable hub 58 of the second sheave 34 not being sectioned in FIGS. 5-7. The movable hub 58 is partially disposed in the internal cavity 38 of the first sheave 30. Illustratively, the movable hub 58 couples to the belt-engaging portion 60 of the second sheave 34 (including the inner belt-engaging surface 36) via one or more fasteners 62 (FIG. 5). In other embodiments, the movable hub 58 and the belt-engaging portion 60 of the second sheave 34 may be coupled in other manners. For example, the movable hub 58 and the belt-engaging portion 60 of the second sheave 34 may be monolithically coupled to, or integrally formed with, each other. Illustratively, the movable hub 58 is generally cylindrical and includes a central body 64, a first flange 66 at a first end, and a second flange 68 at a second end opposite the first end.

Illustratively, the first flange 66 monolithically couples to, or is integrally formed with, the central body 64, and the second flange 68 couples to the central body 64 via a plurality of fasteners (not shown). In other embodiments, the movable hub 58 may be constructed in other manners. For example, the first flange 66 may couple to the central body 64 via one or more fasteners, and/or the second flange 68 may be monolithically coupled to, or integrally formed with, the central body 64.

The first flange 66 includes a plurality of apertures 70, illustratively through apertures, (FIGS. 5 and 6) each of which receives a spring 72 (FIG. 7) for biasing the helix assembly 40 away from the first flange 66. Illustratively, the springs 72 are compression springs. In other embodiments, the first flange 66 may lack the apertures 70, and the springs 72 may take other forms. For example, one or more wave springs or leaf springs may be disposed between the first flange 66 and the helix assembly 40.

Figure 8:
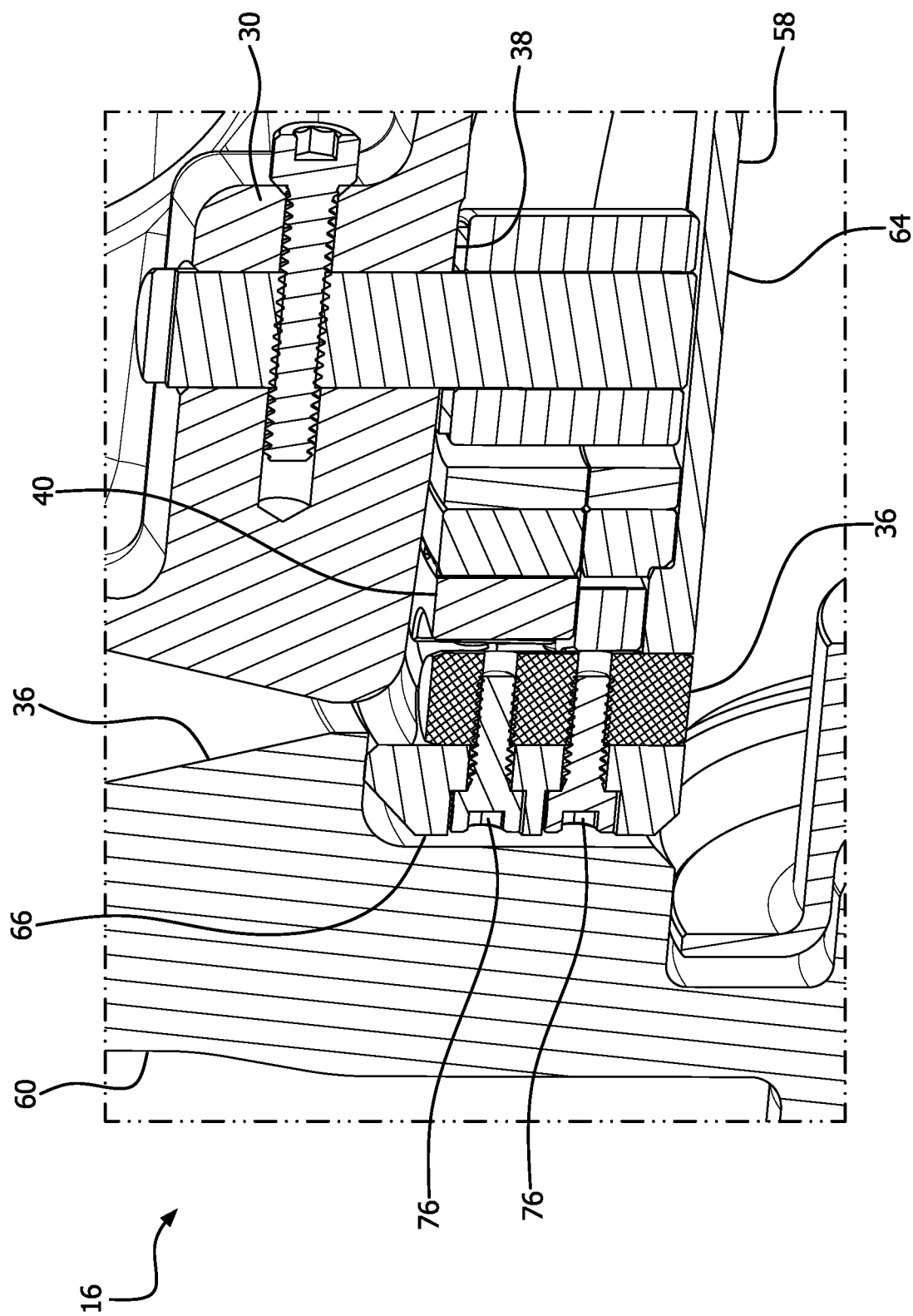
FIG. 8 is a detail perspective sectional view of the first sheave, the second sheave, and a helix assembly of the driven clutch of FIG. 2, specifically illustrating a first flange and a drive protrusion of the second sheave.

With continued reference to FIGS. 5-8, the first flange 66 couples to one or more drive protrusions 74, illustratively three drive protrusions 74, that extend toward the helix assembly 40. Illustratively and as depicted in FIG. 8, each drive protrusion 74 couples to the first flange 66 via one or more fasteners 76. The fasteners 76 preferably extend from the side of the first flange 66 opposite from where the drive protrusions 74 protrude so as to secure the drive protrusions 74 to the first flange 66. Preferably and as illustrated, the drive protrusions 74 are cylindrical in shape. Alternatively, the drive protrusions 74 may have a different shape, such square, angular, or the like. Illustratively, the drive protrusions 74 are offset from each other by equal angles around the sheave axis 42. In other embodiments, the drive protrusions 74 may have different features and/or arrangements. For example, in some embodiments the protrusions 74 may be monolithically coupled to, or integrally formed with, the first flange 66. As another example, in some embodiments the protrusions 74 may be offset from each other by unequal angles around the sheave axis 42.

Figure 9:
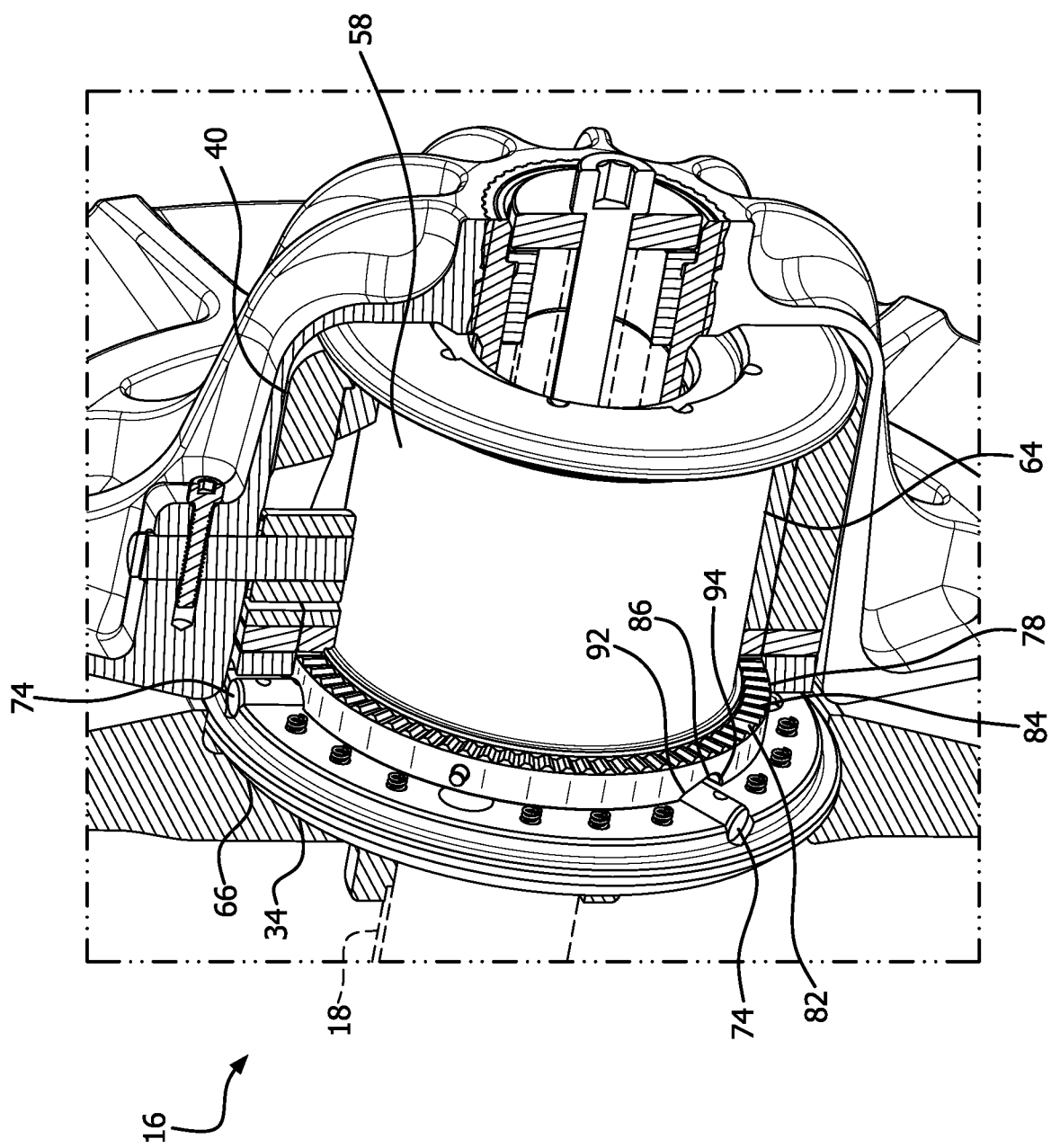
FIG. 9 is a detail perspective partial sectional view of the driven clutch of FIG. 2 with the movable hub of the second sheave, a driven shaft, an engine braking lock ring of the helix assembly not being sectioned.
Figure 10:
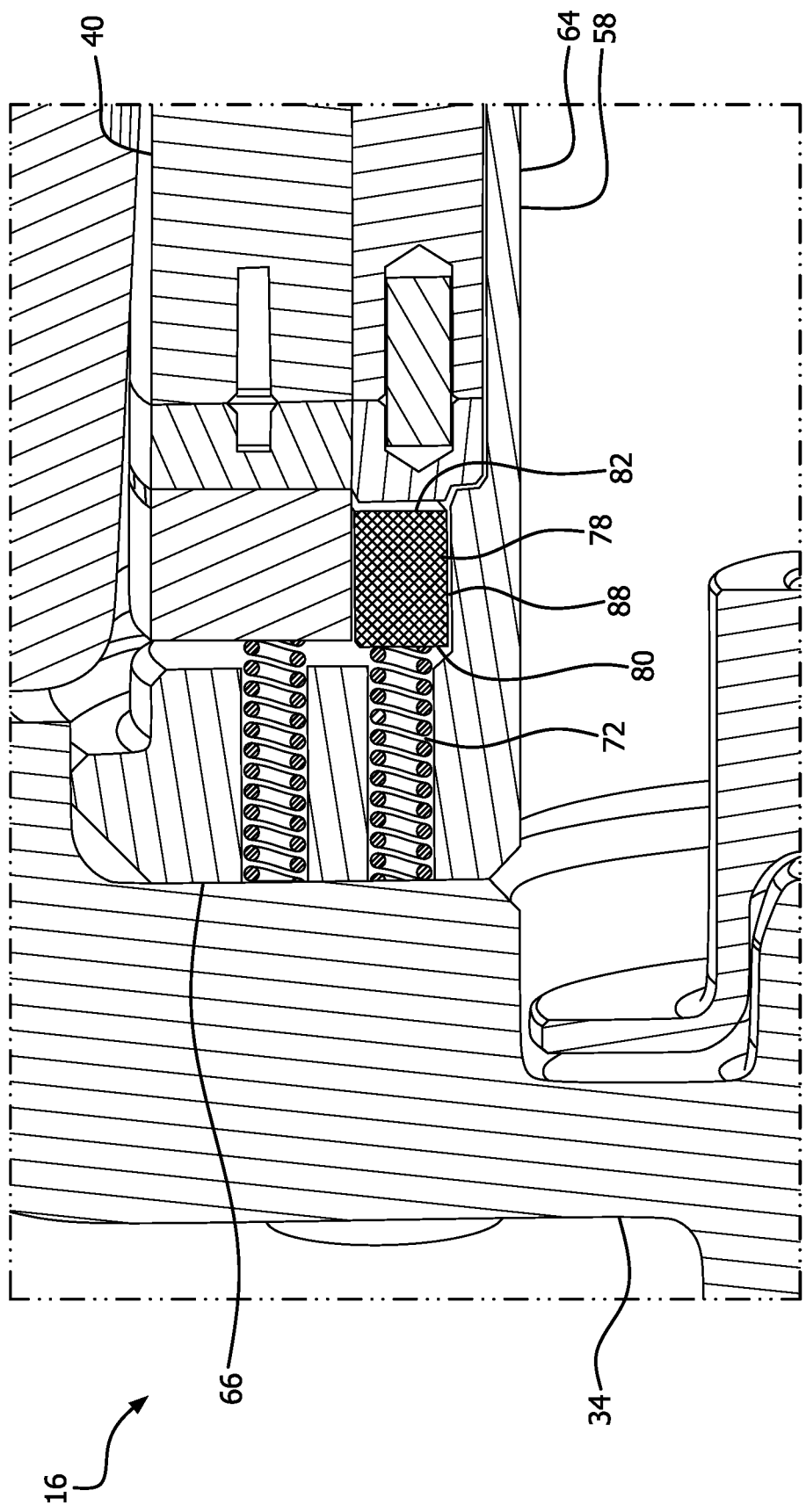
FIG. 10 is a detail perspective sectional view of the first sheave, the second sheave, and the helix assembly of the driven clutch of FIG. 2, specifically illustrating the engine braking ring of the helix assembly.
Figure 11:
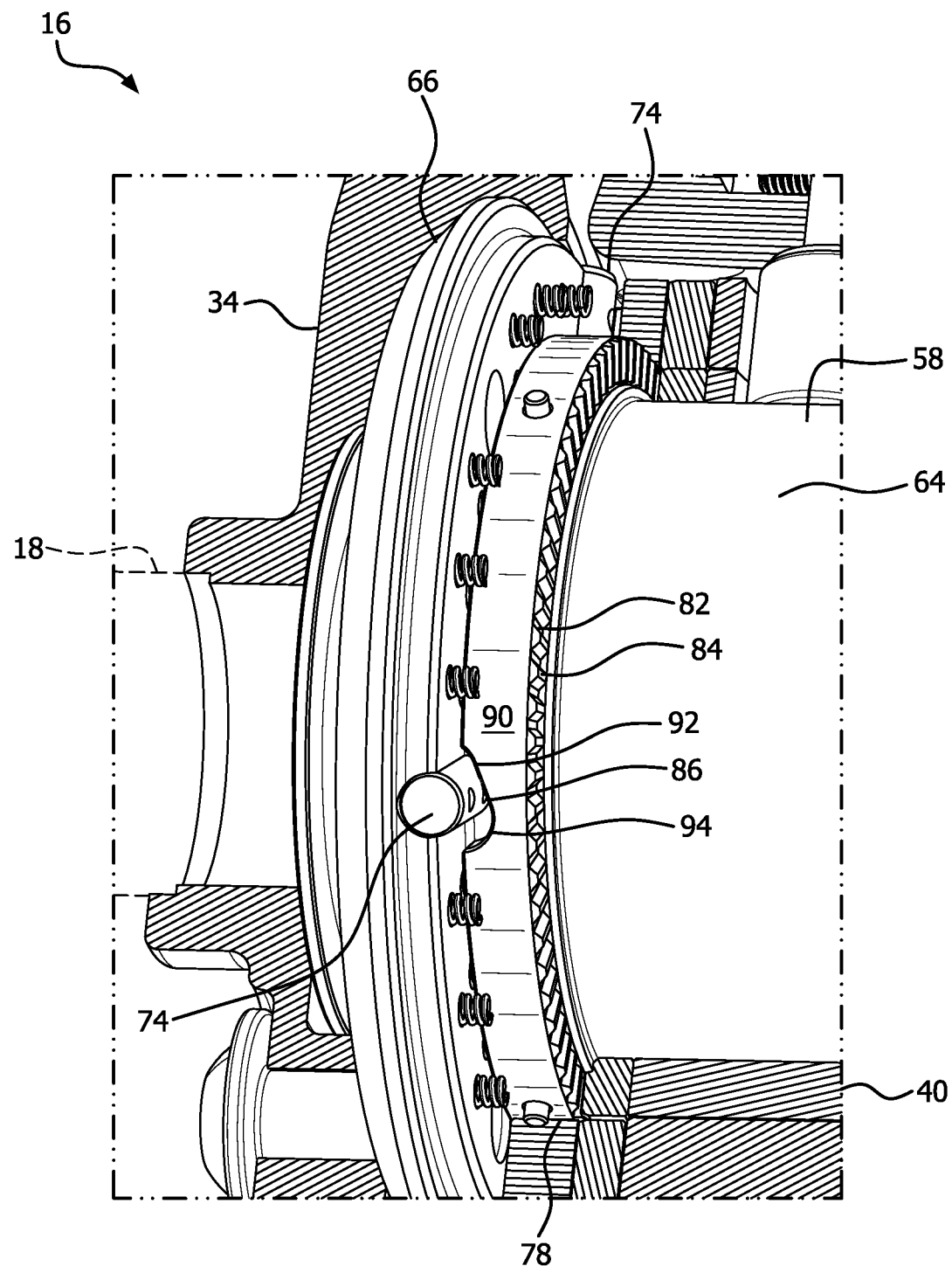
FIG. 11 is another detail perspective partial sectional view of the driven clutch of FIG. 2 with the movable hub of the second sheave and the engine braking lock ring of the helix assembly not being sectioned.

FIGS. 9-11 further depict the driven clutch 16, with the following components not being sectioned in FIGS. 9 and 11: the shaft 18 (FIG. 9), the movable hub 58 of the second sheave 34 and an engine braking lock ring 78 of the helix assembly 40. The engine braking lock ring 78 is carried radially outwardly from, and rotatable and translatable relative to, the central body 64 of the movable hub 58 and disposed next to the first flange 66 of the movable hub 58. The engine braking lock ring 78 includes a first side surface 80 (FIG. 10) that contacts some of the springs 72 carried by the first flange 66. Opposite the first side surface 80, the engine braking lock ring 78 includes a second side surface 82 that has a first plurality of engine braking teeth 84 (FIGS. 9 and 11) for contacting another component of the helix assembly 40, as described in further detail below. The engine braking lock ring 78 also includes one or more grooves 86 (FIGS. 9 and 11), corresponding to the number of drive protrusions 74 and illustratively three grooves 86. Each groove 86 is formed in the first side surface 80 and extends from a radially inner surface 88 (FIG. 10) to a radially outer surface 90 (FIG. 11) of the engine braking lock ring 78. As described in further detail below, each groove 86 includes a contour that has a relatively shallow portion 92 and a relatively deep portion 94 that receive one of the drive protrusions 74 of the movable hub 58, depending on the direction in which torque is applied to the clutch 16. In some embodiments, the grooves 86 may be formed on the first flange 66 and the drive protrusions 74 may be carried by or formed on the engine braking lock ring 78.

Figure 12:
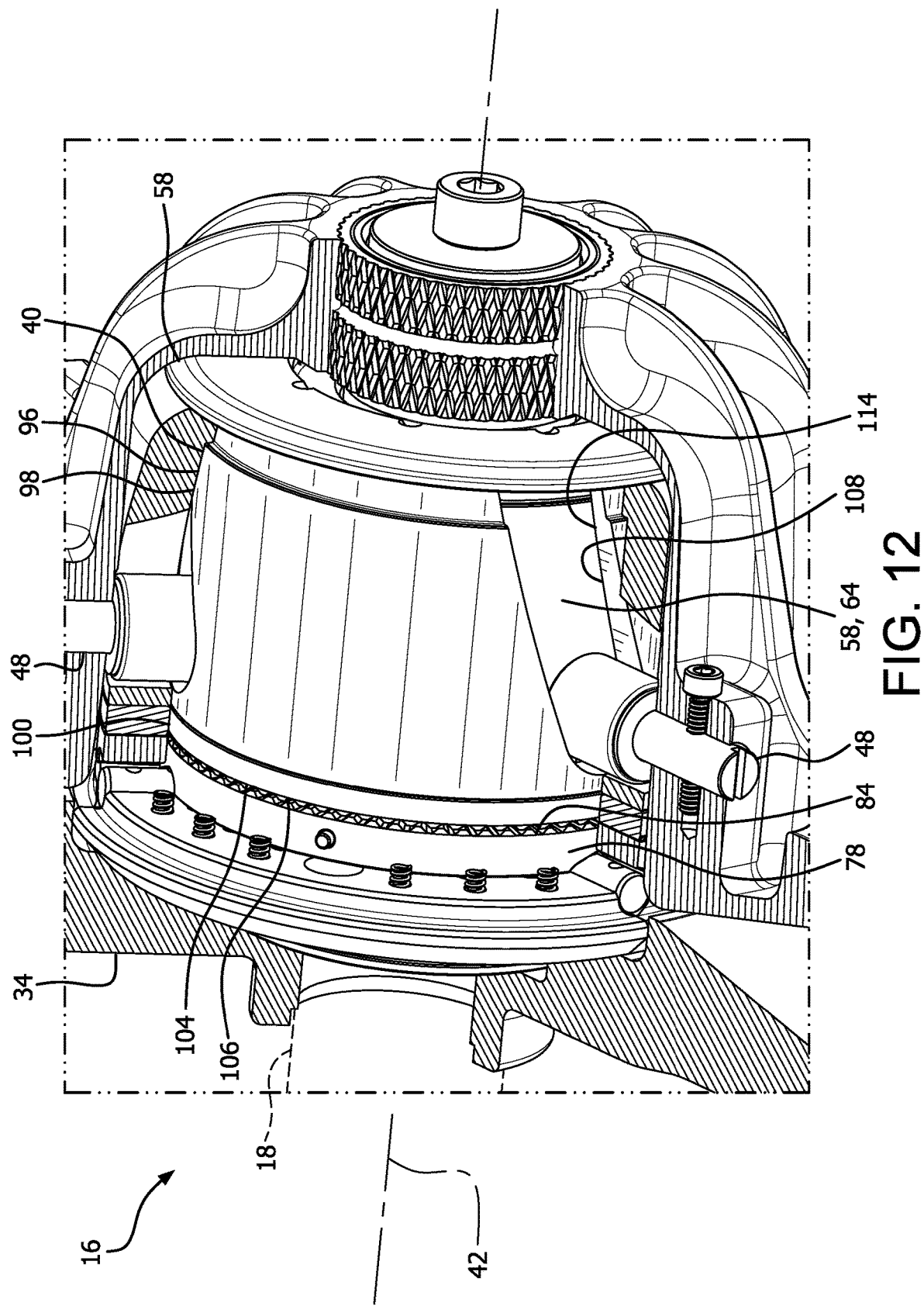
FIG. 12 is a detail perspective partial sectional view of the driven clutch of FIG. 2 with the driven shaft, the movable hub of the second sheave, the roller assemblies, the engine braking lock ring, and an engine braking helix of the helix assembly not being sectioned.
Figure 13:
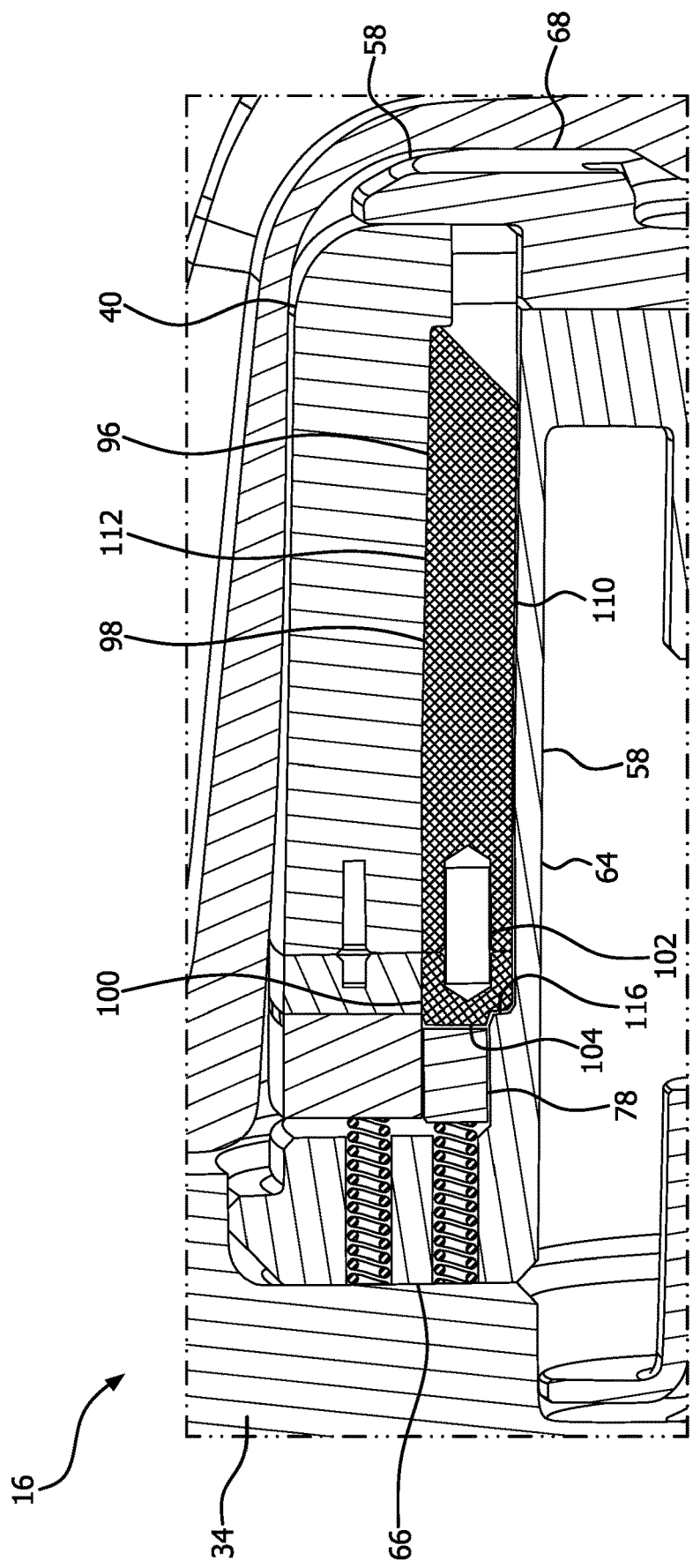
FIG. 13 is a detail perspective sectional view of the first sheave, the second sheave, and the helix assembly of the driven clutch of FIG. 2, specifically illustrating the engine braking helix of the helix assembly.

FIGS. 12 and 13 further depict the driven clutch 16, with the following components not being sectioned in FIG. 12: the shaft 18, the movable hub 58 of the second sheave 34, the engine braking lock ring 78, the roller assemblies 48, and a first, or engine braking, helix 96 of the helix assembly 40. The engine braking helix 96 includes an engine braking helix base 98 and an engine braking drive ring 100 that are both carried radially outwardly from the central body 64 of the movable hub 58 (FIG. 13). Illustratively, the engine braking helix base 98 and the engine braking drive ring 100 are fixedly coupled via one or more pins 102 (FIG. 13). In other embodiments, the engine braking helix base 98 and the engine braking drive ring 100 may be coupled in other manners. For example, in some embodiments the engine braking helix base 98 and the engine braking drive ring 100 may be monolithically coupled to, or integrally formed with, each other.

On a first side surface 104, the engine braking drive ring 100 includes a second plurality of engine braking teeth 106 (FIG. 12) for contacting and interdigitating with the first plurality of engine braking teeth 84 of the engine braking lock ring 78, as described in further detail below.

The engine braking helix base 98 includes one or more roller slots 108 (FIG. 12), corresponding to the number of roller assemblies 48 and each receiving one of the roller assemblies 48. Each roller slot 108 extends from an inner surface 110 (FIG. 13) to an outer surface 112 of the engine braking helix base 98. Each slot 108 defines an engine braking cam surface or ramp 114 (FIG. 12), and each engine braking ramp 114 extends helically around the sheave axis 42 (FIG. 12) in a first ramp direction.

With specific reference to FIG. 13, the engine braking helix 96 is translatably fixed relative to the movable hub 58. Illustratively, the engine braking drive ring 100 contacts a shoulder 116 of the central body 64 of the movable hub 58 to inhibit translation toward the first flange 66 of the movable hub 58, and the engine braking helix base 98 contacts the second flange 68 of the movable hub 58 to inhibit translation away from the first flange 66 of the movable hub 58.

Figure 14:
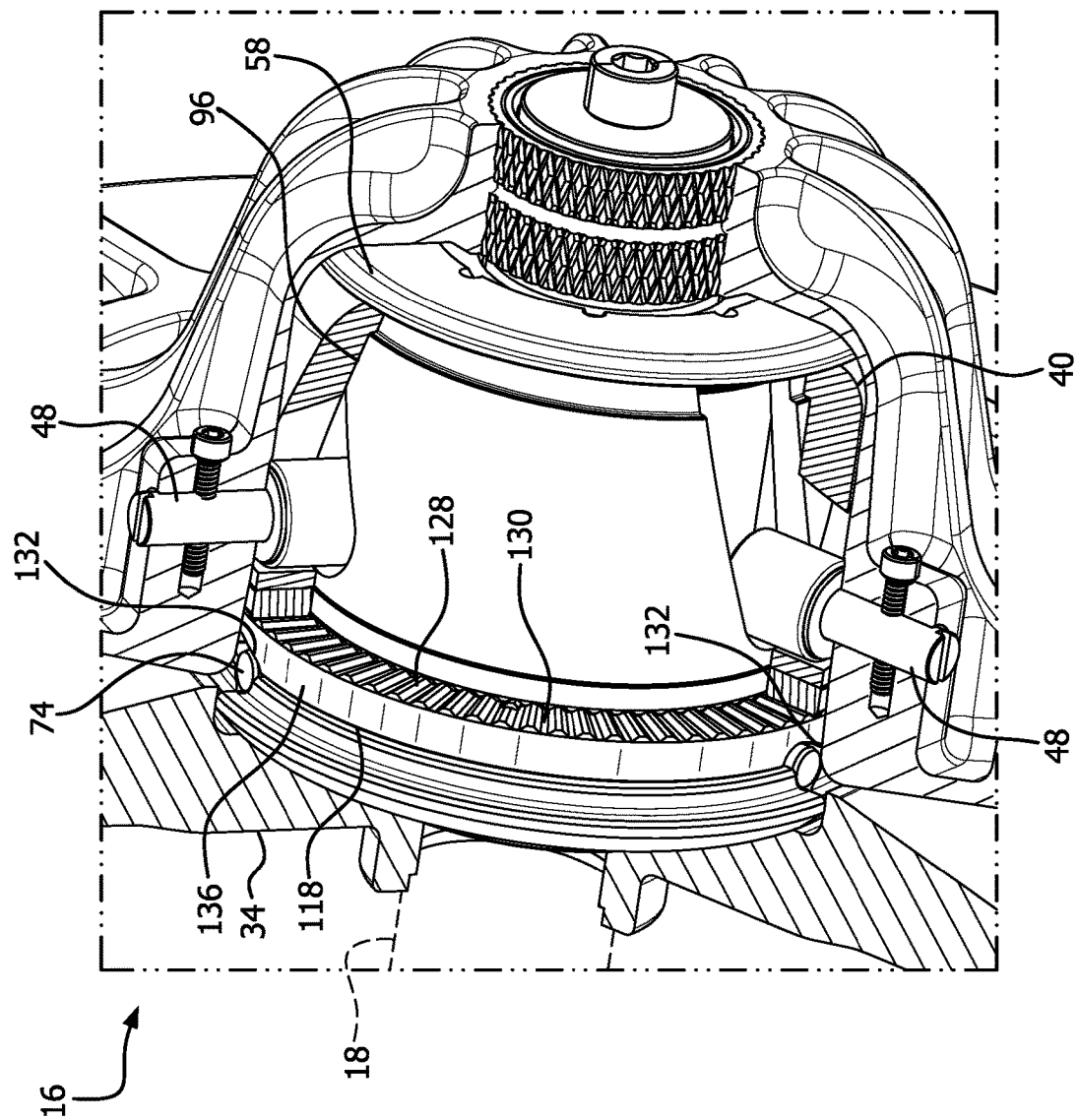
FIG. 14 is a detail perspective partial sectional view of the driven clutch of FIG. 2 with the driven shaft, the movable hub of the second sheave, the roller assemblies, the engine braking lock ring, the engine braking helix, and an acceleration lock ring of the helix assembly not being sectioned.
Figure 15:
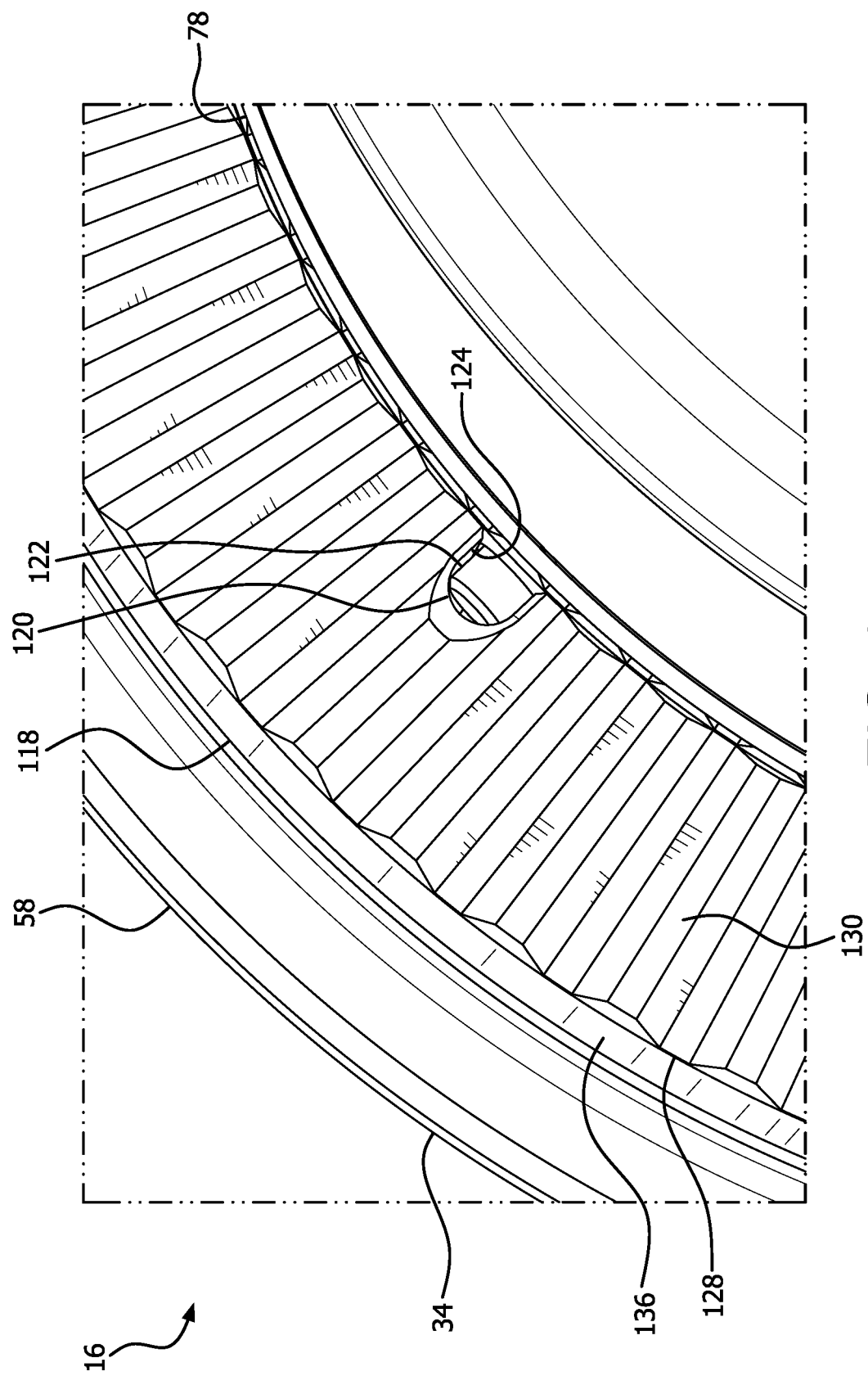
FIG. 15 is a detail perspective view of the engine braking lock ring and the acceleration lock ring of the driven clutch of FIG. 2, specifically illustrating a rotational coupling between the lock rings.
Figure 16:
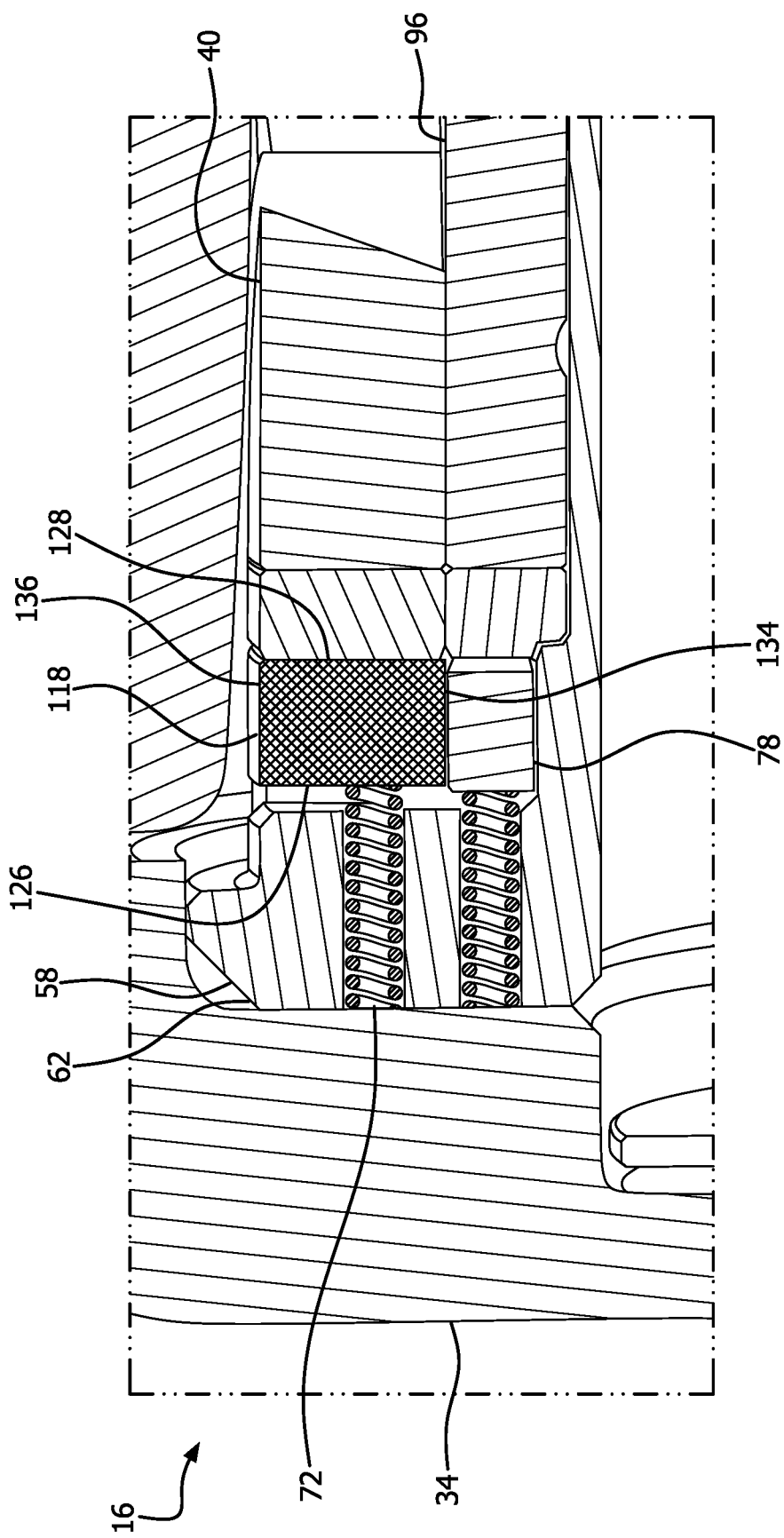
FIG. 16 is a detail perspective sectional view of the first sheave, the second sheave, and the helix assembly of the driven clutch of FIG. 2, specifically illustrating the acceleration ring of the helix assembly.
Figure 17:
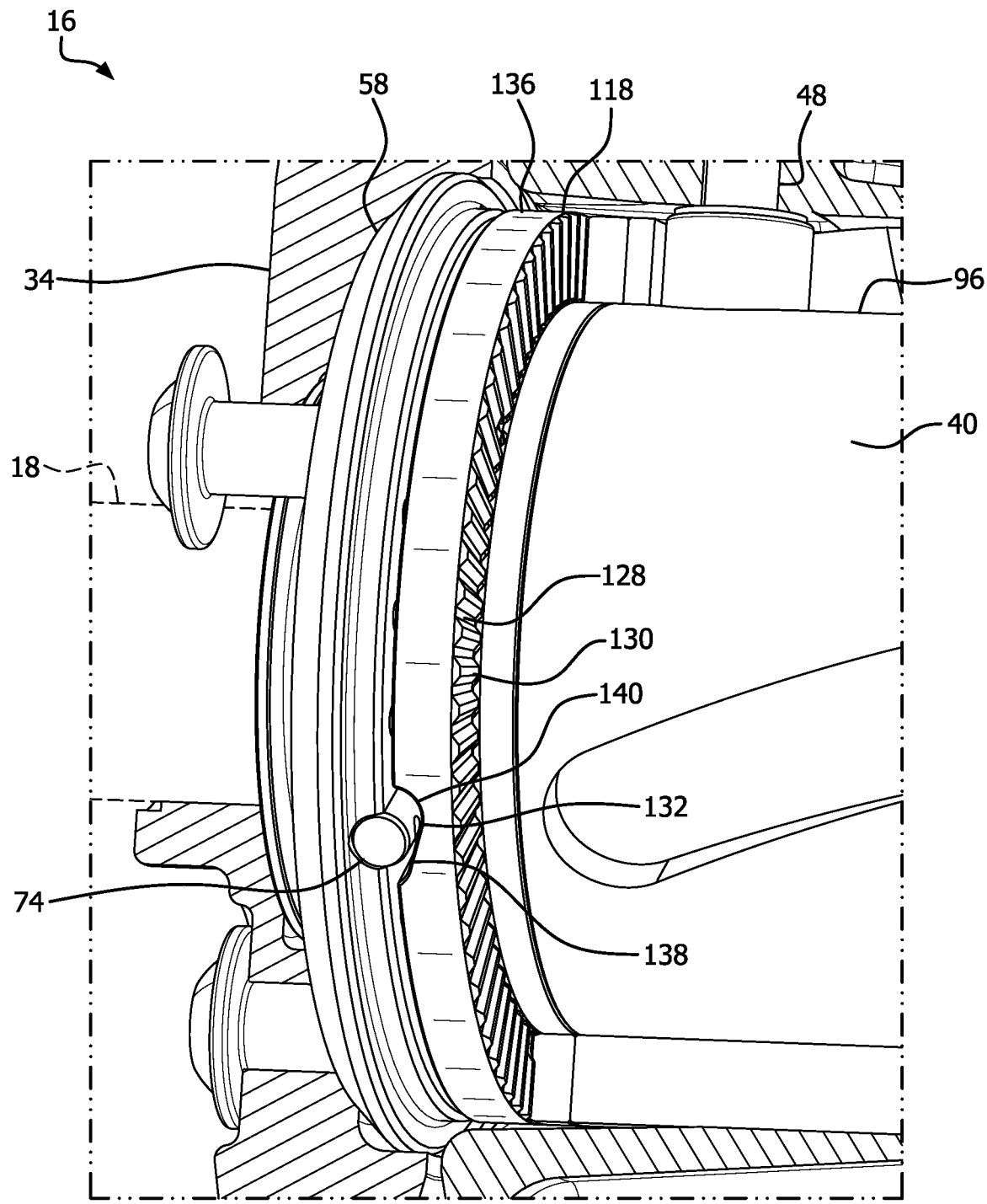
FIG. 17 is another detail perspective partial sectional view of the driven clutch of FIG. 2 with the movable hub of the second sheave and the acceleration lock ring of the helix assembly not being sectioned.

FIGS. 14-17 further depict the driven clutch 16, with the following components not being sectioned in FIGS. 14 and 17: the shaft 18, the movable hub 58 of the second sheave 34, the roller assemblies 48, the engine braking helix 96, and an acceleration lock ring 118 of the helix assembly 40. The acceleration lock ring 118 is carried radially outwardly from the engine braking lock ring 78 (FIGS. 15 and 16). More specifically and as illustrated in FIG. 15, the acceleration lock ring 118 and the engine braking lock ring 78 are coupled by a rotational coupling 120. The rotational coupling 120 permits relative translation of the acceleration lock ring 118 and the engine braking lock ring 78 along the sheave axis 42 (shown elsewhere), and rotatably fixes or interlocks the acceleration lock ring 118 and the engine braking lock ring 78 such that they rotate together about the sheave axis 42. Illustratively, the rotational coupling 120 includes a pin 122 that extends outwardly from the engine braking lock ring 78 and is received in a recess 124 of the acceleration lock ring 118. In other embodiments, the rotational coupling 120 may take other forms. For example, the pin 122 could by carried by the acceleration lock ring 118 and the recess 124 could be formed on the engine braking lock ring 78.

With general reference again to FIGS. 14-17, the acceleration lock ring 118 includes a first side surface 126 (FIG. 16) that contacts some of the springs 72 carried by the first flange 66. Opposite the first side surface 126, the acceleration lock ring 118 includes a second side surface 128 that has a first plurality of acceleration teeth 130. Each tooth 130 extends radially along and protrudes axially from the second side surface 128 (FIGS. 14, 15, and 17) for contacting another component of the helix assembly 40, as described in further detail below. The acceleration lock ring 118 also includes one or more grooves 132 (FIGS. 14 and 17), illustratively three grooves 132, each formed in the first side surface 126 and extending from a radially inner surface 134 (FIG. 16) to a radially outer surface 136 (FIG. 17) of the acceleration lock ring 118. As described in further detail below, each groove 132 includes a contour with a relatively shallow portion 138 (FIG. 17) and a relatively deep portion 140 (FIG. 17) that receive one of the drive protrusions 74 of the movable hub 58, depending on the direction in which torque is applied to the clutch 16. Each groove 132 is angularly aligned with, but with its contour oppositely oriented relative to, the contour of one of the grooves 86 of the engine braking lock ring 78 (shown elsewhere). More specifically, the relatively shallow portion 138 of each groove 132 is angularly aligned with one of the relatively deep portions 94 of one of the grooves 86 of the engine braking lock ring 78 (shown elsewhere) and the relatively deep portion 140 of each groove 132 is angularly aligned with one of the relatively shallow portions 92 of one of the grooves 86 of the engine braking lock ring 78 (shown elsewhere).

Figure 18:
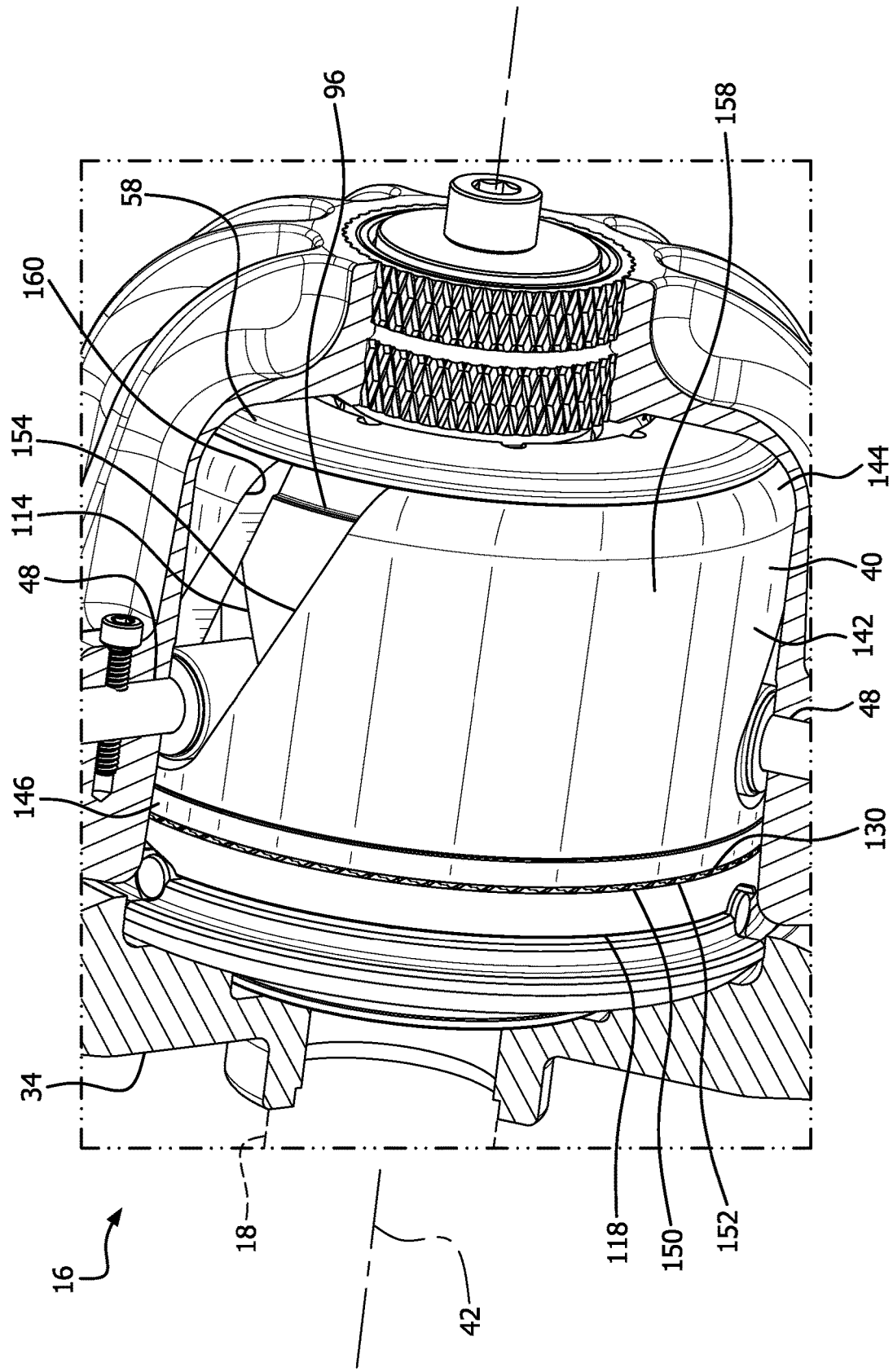
FIG. 18 is a detail perspective partial sectional view of the driven clutch of FIG. 2 with the driven shaft, the movable hub of the second sheave, the roller assemblies, the engine braking helix, the acceleration lock ring, and an acceleration helix of the helix assembly not being sectioned.
Figure 19:
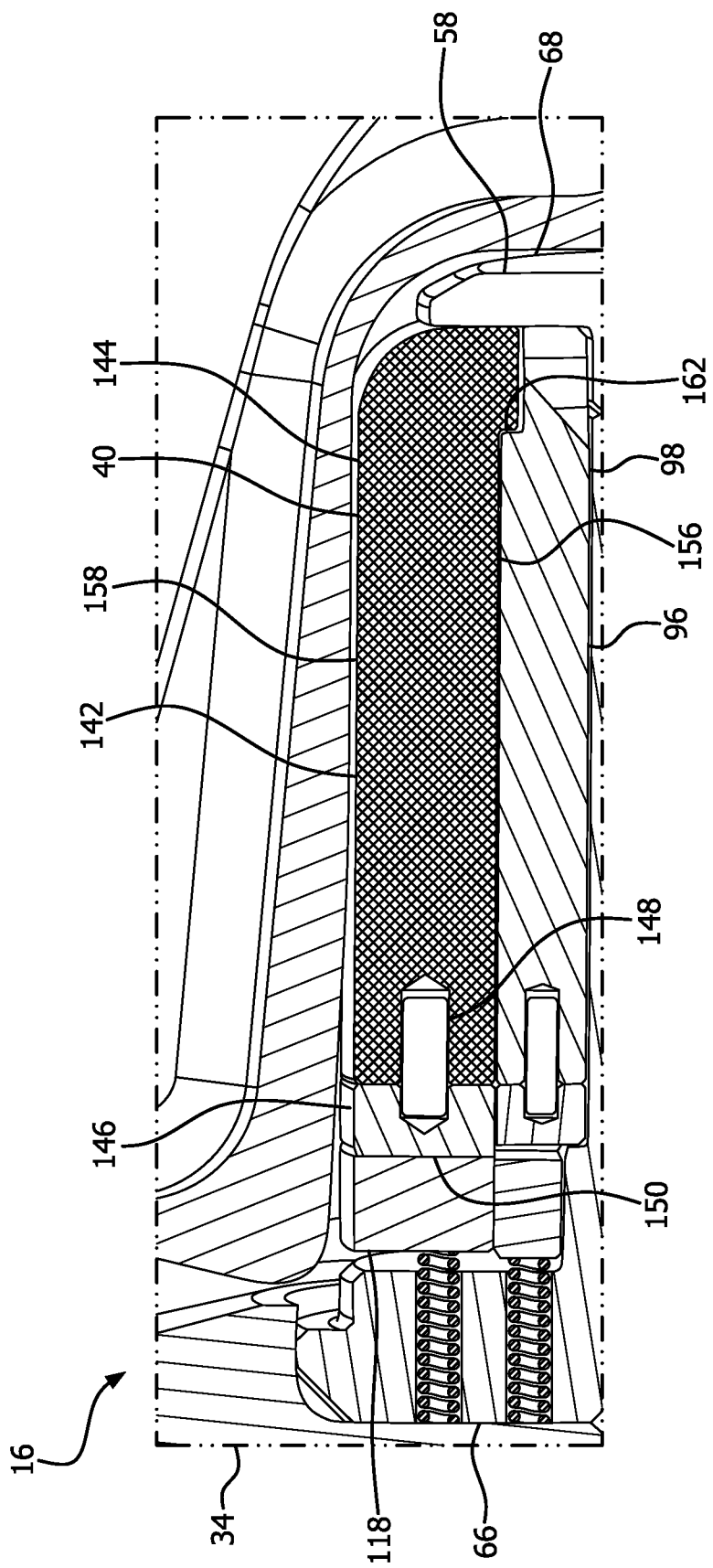
FIG. 19 is a detail perspective sectional view of the first sheave, the second sheave, and the helix assembly of the driven clutch of FIG. 2, specifically illustrating the acceleration helix of the helix assembly.
Figure 20:
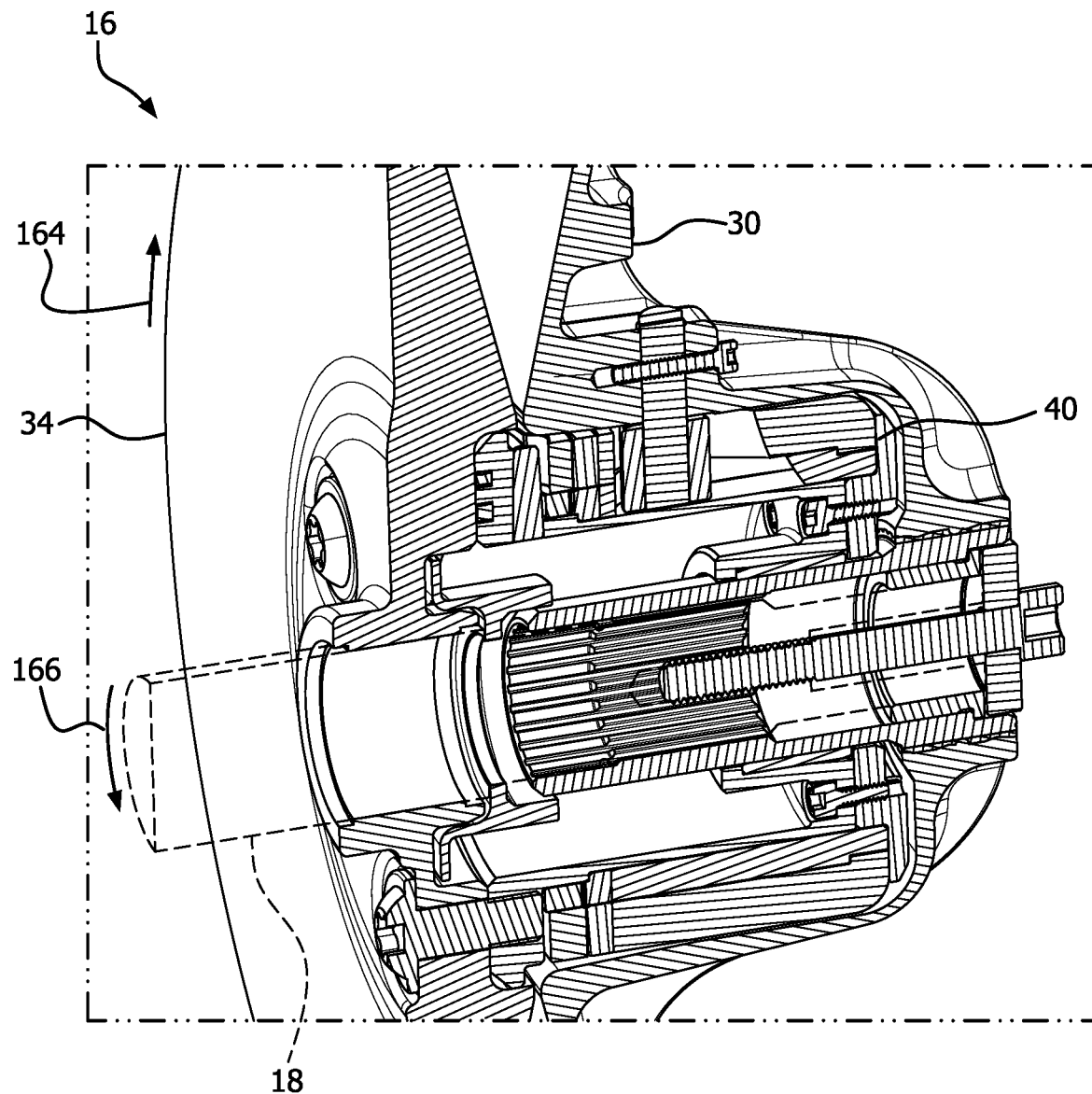
FIG. 20 is a detail perspective sectional view of torque being applied to the driven clutch of FIG. 2 in a manner that causes a vehicle carrying the clutch to accelerate, or an acceleration mode.

FIGS. 18 and 19 further depict the driven clutch 16, with the following components not being sectioned in FIG. 18: the shaft 18, the movable hub 58 of the second sheave 34, the roller assemblies 48, the acceleration lock ring 118, and a second, or acceleration, helix 142 of the helix assembly 40. The acceleration helix 142 includes an acceleration helix base 144 and an acceleration drive ring 146 that are both carried radially outwardly from the engine braking helix 96. Illustratively, the acceleration helix base 144 and the acceleration drive ring 146 are fixedly coupled via one or more pins 148 (FIG. 19). In other embodiments, the acceleration helix base 144 and the acceleration drive ring 146 may be coupled in other manners. For example, in some embodiments the acceleration helix base 144 and the acceleration drive ring 146 may be monolithically coupled to, or integrally formed with, each other.

On a first side surface 150, the acceleration drive ring 146 includes a second plurality of acceleration teeth 152 (FIG. 18). Each tooth 152 extends radially along and protrudes axially from the first side surface 150 for contacting and interdigitating or mating with the first plurality of acceleration teeth 130 of the acceleration lock ring 118, as described in further detail below.

The acceleration helix base 144 includes one or more roller slots 154 (FIG. 18), corresponding to the number of roller assemblies 48 and each receiving one of the roller assemblies 48. Each roller slot 154 extends from an inner surface 156 (FIG. 19) to an outer surface 158 of the acceleration helix base 144. Each slot 154 defines an acceleration cam surface or ramp 160, and each acceleration ramp 160 extends helically around the sheave axis 42 (FIG. 18) in a second ramp direction opposite the first ramp direction of the engine braking ramps 114. Stated another way, the clutch 16 includes two relatively rotatable helixes 96 and 142 with separate, and oppositely extending, ramps 114 and 160, respectively.

With specific reference to FIG. 19, the acceleration helix 142 is translatably fixed relative to the engine braking helix 96. Illustratively, the acceleration helix base 144 contacts a shoulder 162 of the engine braking helix base 98 to inhibit translation toward the first flange 66 of the movable hub 58, and the acceleration helix base 144 contacts the second flange 68 of the movable hub 58 to inhibit translation away from the first flange 66 of the movable hub 58.

FIGS. 20-24 illustrate operation of the clutch 16 in an acceleration mode. More specifically and referring to FIG. 20, the belt 20 (shown elsewhere) applies torque 164 to the clutch 16 in a first, or acceleration, direction and the shaft 18 (FIG. 20) applies reaction torque 166 to the clutch 16 in an opposite second direction. About half of the torque 164 applied by the belt 20 is transmitted through the first sheave 30 directly to the shaft 18 (that is, not via the helix assembly 40) and about half of the torque 164 applied by the belt 20 is transmitted through the second sheave 34 and the helix assembly 40.

Figure 21:
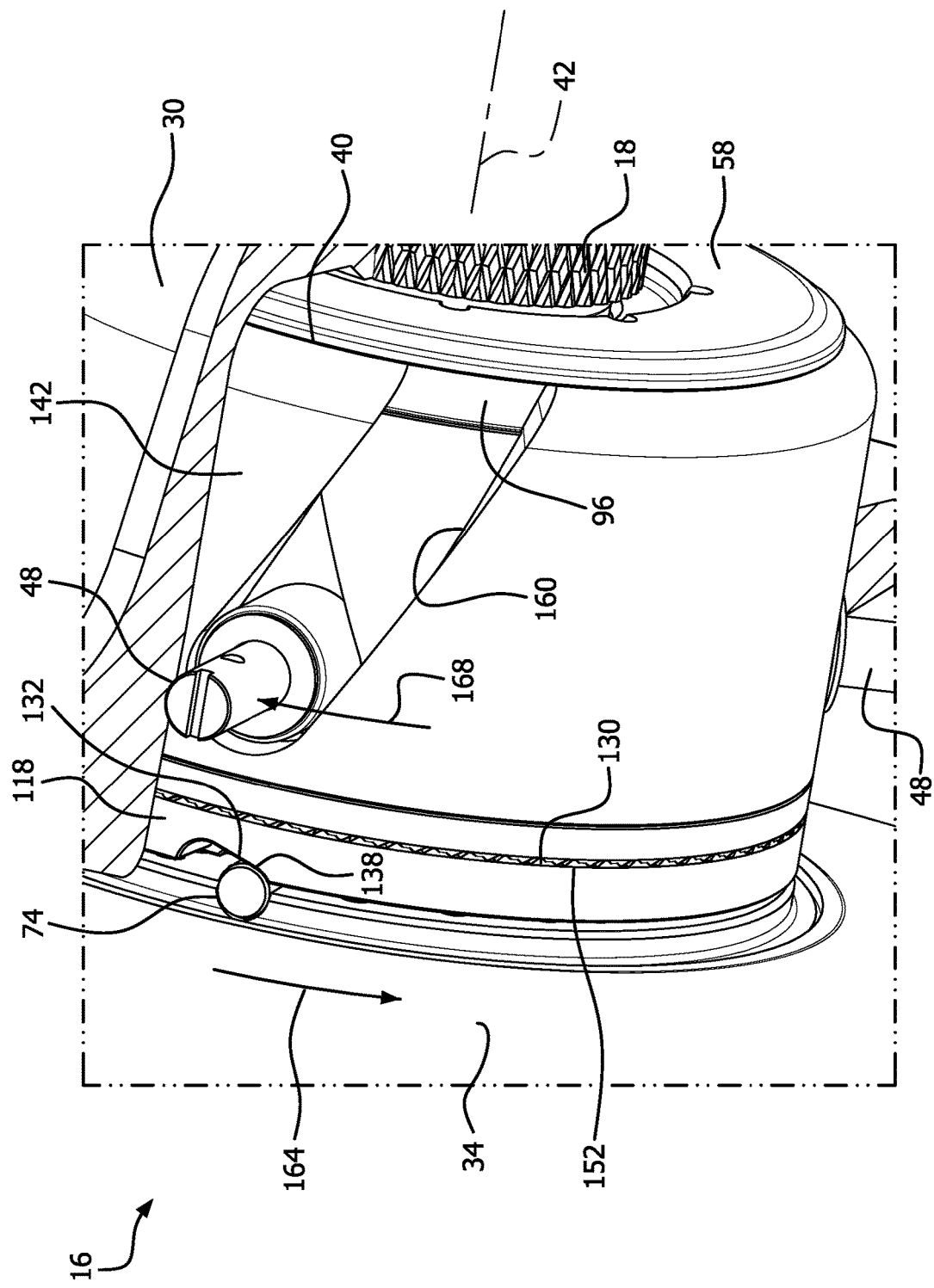
FIG. 21 is a detail perspective sectional view of the driven clutch in the acceleration mode of FIG. 20 and before upshifting, with the driven shaft, the movable hub of the second sheave, the roller assemblies, the engine braking helix, the acceleration lock ring, and the acceleration helix not being sectioned.
Figure 22:
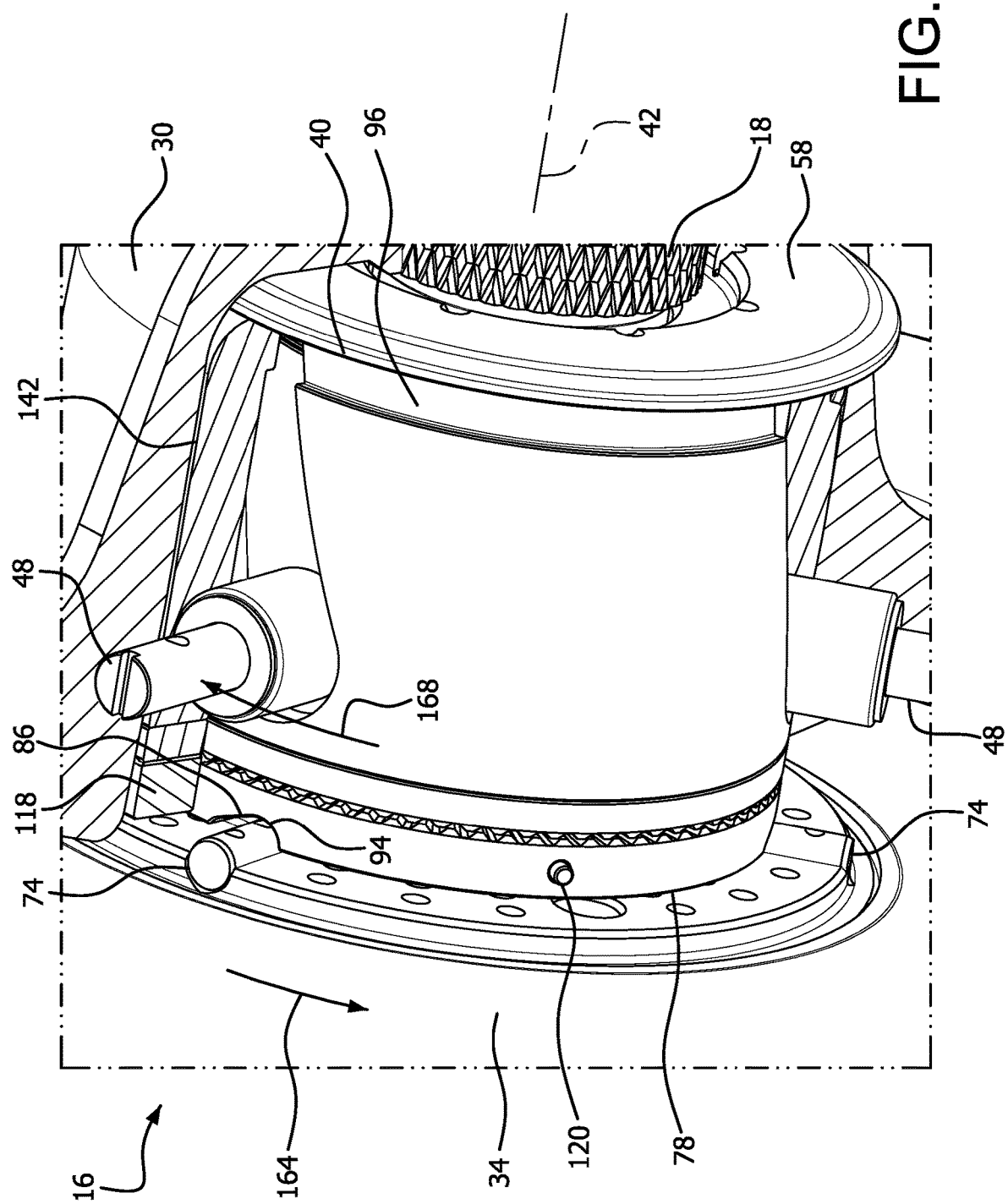
FIG. 22 is a detail perspective sectional view of the driven clutch in the acceleration mode of FIG. 20 and before upshifting, with the driven shaft, the movable hub of the second sheave, the roller assemblies, the engine braking lock ring, and the engine braking helix not being sectioned.

Referring to FIGS. 21 and 22, the driven clutch 16 is further depicted in the acceleration mode, and more specifically before upshifting. In FIG. 21 the following components are not sectioned: the shaft 18, the second sheave 34 and its movable hub 58, the roller assemblies 48, the engine braking helix 96, the acceleration lock ring 118, and the acceleration helix 142. FIG. 22 is similar to FIG. 21, except that the acceleration lock ring 118 and acceleration helix 142 are sectioned, and the engine braking lock ring 78 is not sectioned. In the acceleration mode, the reaction torque 166 (FIG. 20) from the shaft 18 causes torque 168 to be applied to the roller assemblies 48 in the second direction. In addition, the springs 72 (shown elsewhere) hold the engine braking lock ring 78 (FIG. 22) and the acceleration lock ring 118 in contact with the engine braking helix 96 and the acceleration helix 142, respectively.

With continued reference to FIGS. 21 and 22, in the acceleration mode the opposing torque between the second sheave 34 and the first sheave 30 and roller assemblies 48 causes the second sheave 34 to rotate about the sheave axis 42 relative to the first sheave 30 and roller assemblies 48. As shown specifically in FIG. 21, the second sheave 34 continues to rotate relative to the first sheave 30 and roller assemblies 48 until each of the drive protrusions 74 of the second sheave 34 contact, or wedge against, one of the grooves 132 (FIG. 21) of the acceleration lock ring 118, more specifically the relatively shallow portion 138 of one of the grooves 132. This contact holds the acceleration lock ring 118 and the acceleration helix 142 in meshing engagement, via the teeth 130 and 152, that is, the teeth 130 interdigitate or mesh with the teeth 152. This action movably secures the second sheave 34 to the acceleration helix 142, and the acceleration helix 142 pushes the movable hub 58 and the remainder of the second sheave 34 toward the first sheave 30, thereby compressing the belt 20 between the first sheave 30 and the second sheave 34.

As specifically shown in FIG. 22, in the acceleration mode each drive protrusion 74 is positioned in the relatively deep portion 94 of one of the grooves 86 of the engine braking lock ring 78, due to the rotational coupling 120 between the engine braking lock ring 78 and the acceleration lock ring 118, the angular alignment of their grooves 86, 132, and the opposite orientation of the grooves 86, 132. As a result, the drive protrusions 74 do not contact the engine braking lock ring 78, the engine braking lock ring 78 remains in a "neutral" position, and the second sheave 34 is movably disconnected from the engine braking helix 96.

While the belt 20 continues to apply torque 164 to the clutch 16 in the acceleration direction, the second sheave 34 remains movably secured to the acceleration helix 142. As the clutch 16 upshifts, the second sheave 34 rotates relative to the first sheave 30 and the roller assemblies 48 based on the helix angle of the acceleration ramp 160 (FIG. 21).

Figure 23:
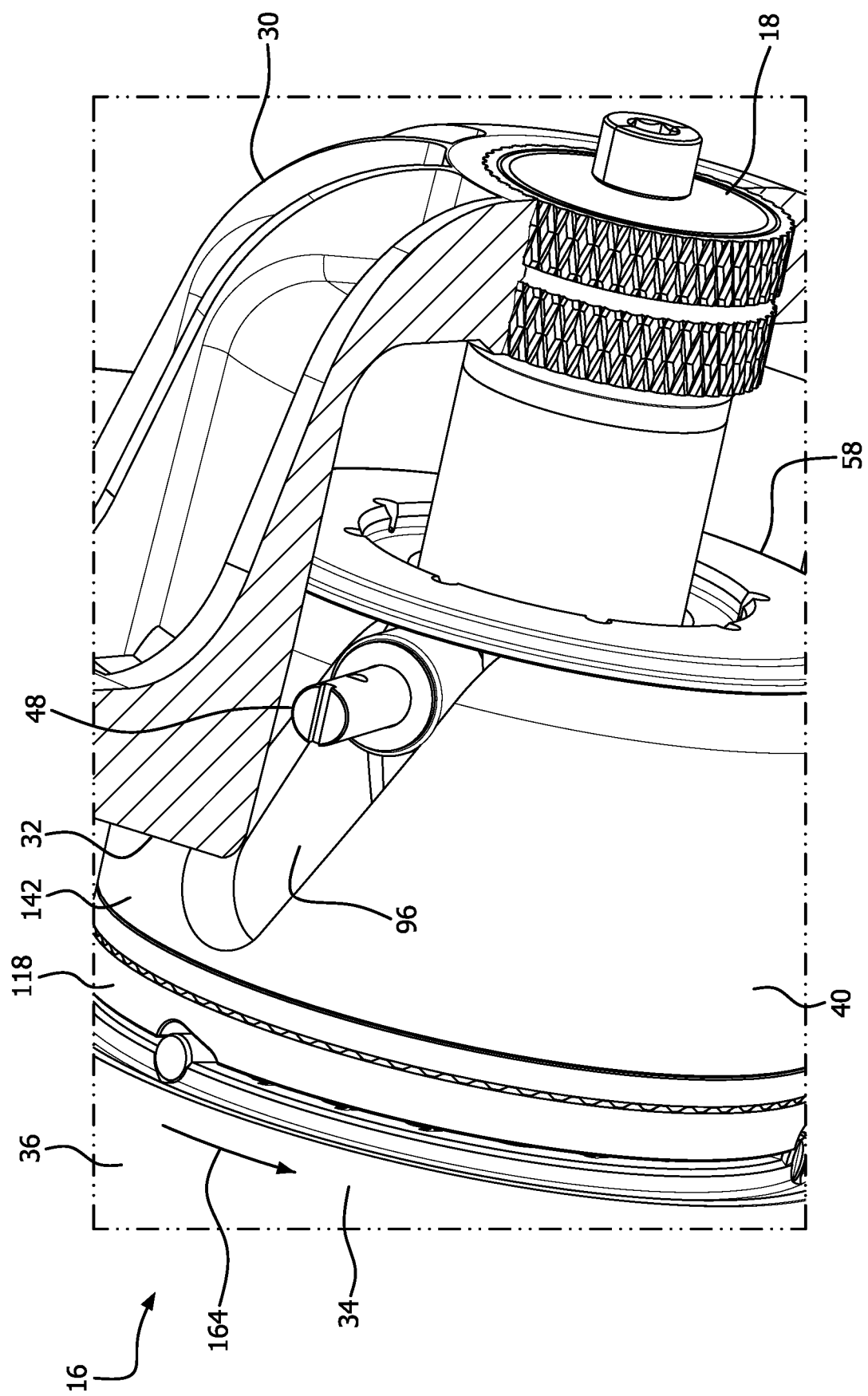
FIG. 23 is a detail perspective sectional view of the driven clutch in the acceleration mode of FIG. 20 and after upshifting, with the driven shaft, the movable hub of the second sheave, the roller assemblies, the engine braking helix, the acceleration lock ring, and the acceleration helix not being sectioned.
Figure 24:
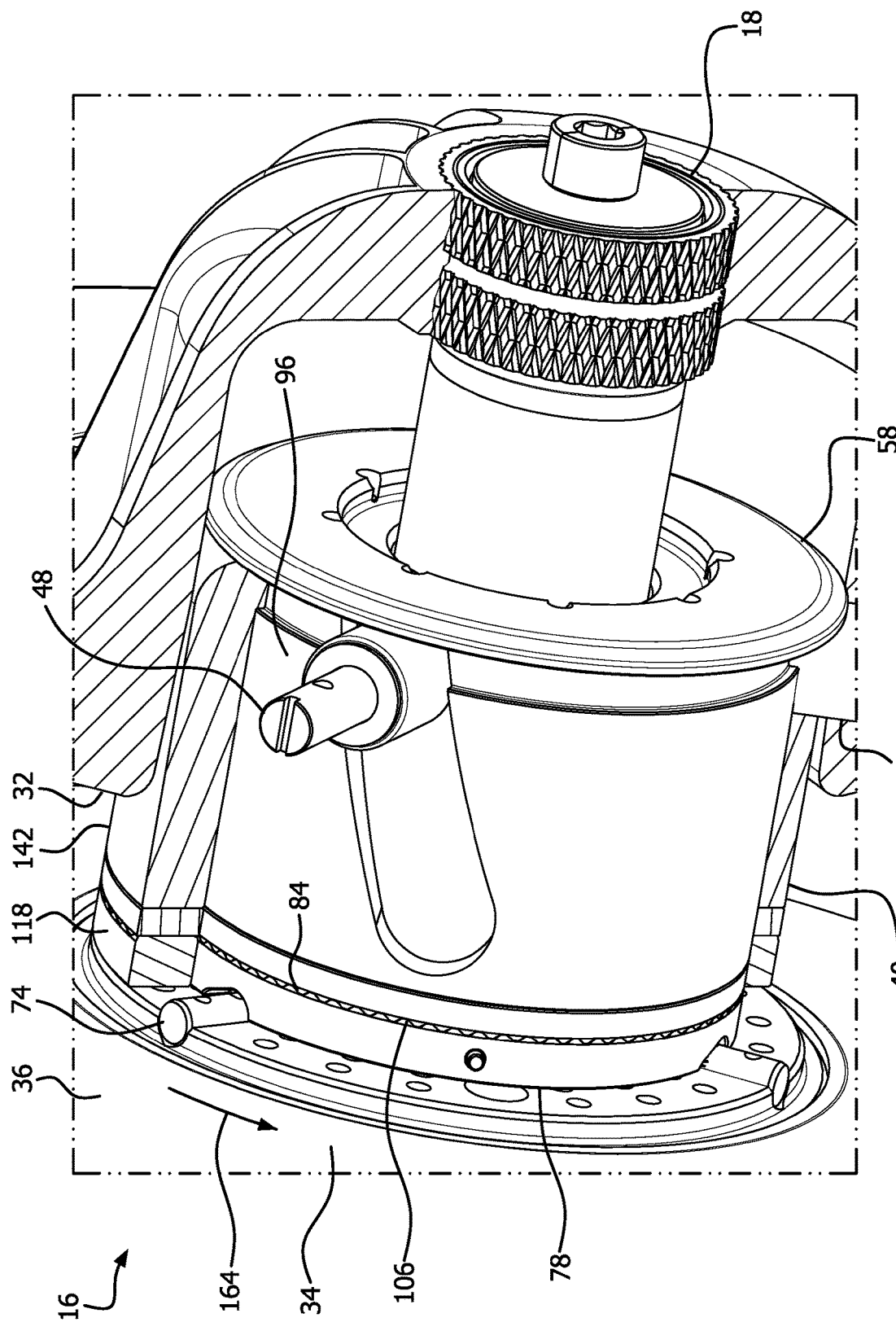
FIG. 24 is a detail perspective sectional view of the driven clutch in the acceleration mode of FIG. 20 and after upshifting, with the driven shaft, the movable hub of the second sheave, the roller assemblies, the engine braking lock ring, and the engine braking helix not being sectioned.

Referring to FIGS. 23 and 24, the driven clutch 16 is further depicted in the acceleration mode, and more specifically after upshifting. In FIG. 23 the following components are not sectioned: the shaft 18, the second sheave 34 and its movable hub 58, the roller assemblies 48, the engine braking helix 96, the acceleration lock ring 118, and the acceleration helix 142. FIG. 24 is similar to FIG. 23, except that the acceleration lock ring 118 and acceleration helix 142 are sectioned, and the engine braking lock ring 78 is not sectioned. After upshifting, the belt-engaging surfaces 32, 36 of the first sheave 30 and second sheave 34 are relatively far apart, permitting the belt 20 to engage the clutch 16 relatively close to the shaft 18 and thereby altering the transmission ratio of the CVT 10.

With specific reference to FIG. 24, while the belt 20 continues to apply torque 164 to the clutch 16 in the acceleration direction, the second sheave 34 remains movably disconnected from the engine braking helix 96, and the second sheave 34 and the engine braking helix 96 rotate relative to each other. More specifically, the engine braking lock ring 78 rotates with the acceleration lock ring 118 (due to the rotational coupling), and the engine braking helix 96 rotates as it follows the roller assemblies 48. Because the engine braking lock ring 78 does not contact the drive protrusions 74, it has axial clearance to compress the springs 72 (shown elsewhere) and translate back and forth (axially) as its teeth 84 slide over the teeth 106 of the engine braking helix 96.

Figure 25:
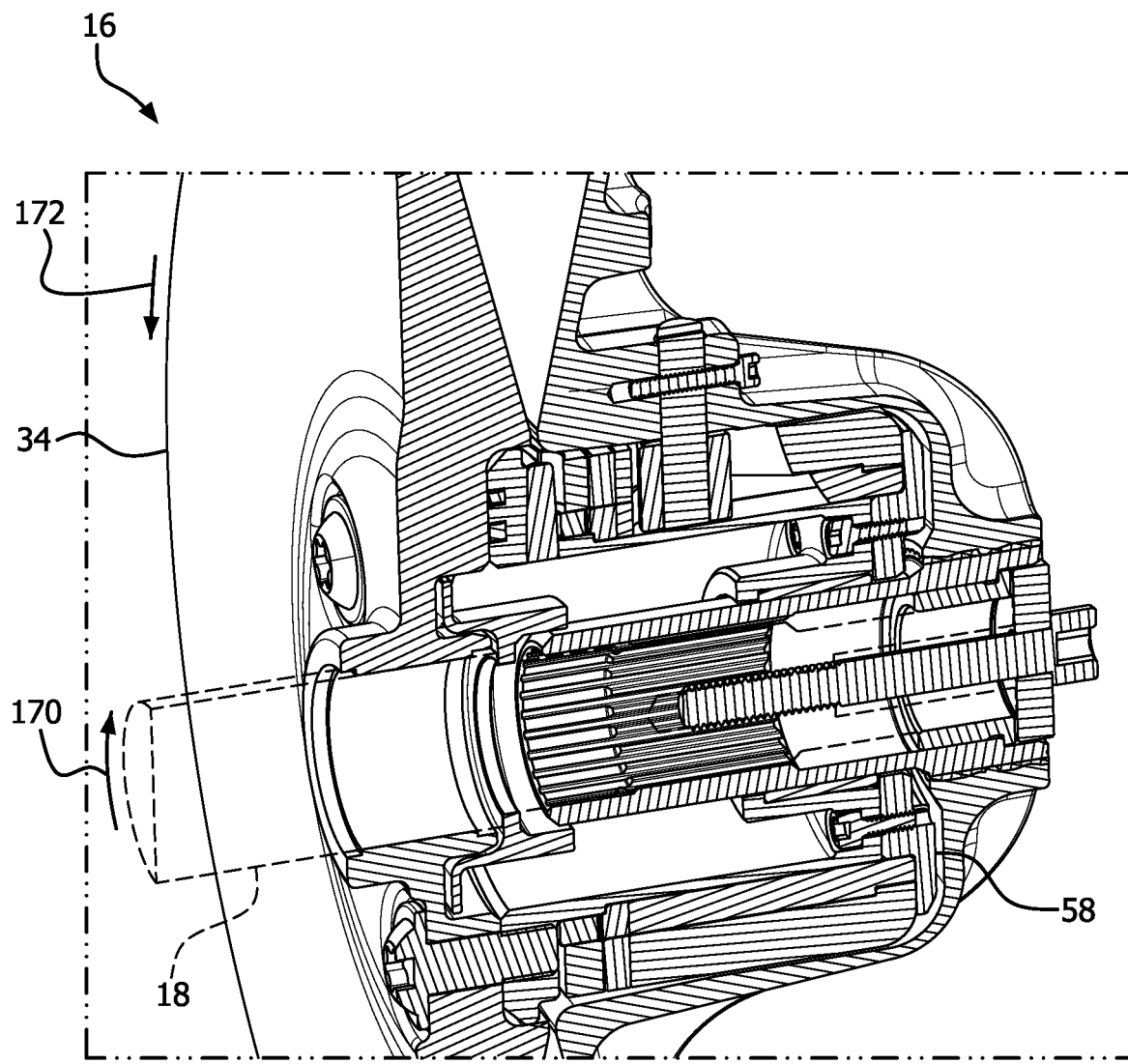
FIG. 25 is a detail perspective sectional view of torque being applied to the driven clutch of FIG. 2 in a manner that causes a vehicle carrying the clutch to engine brake, or an engine braking mode.
Figure 26:
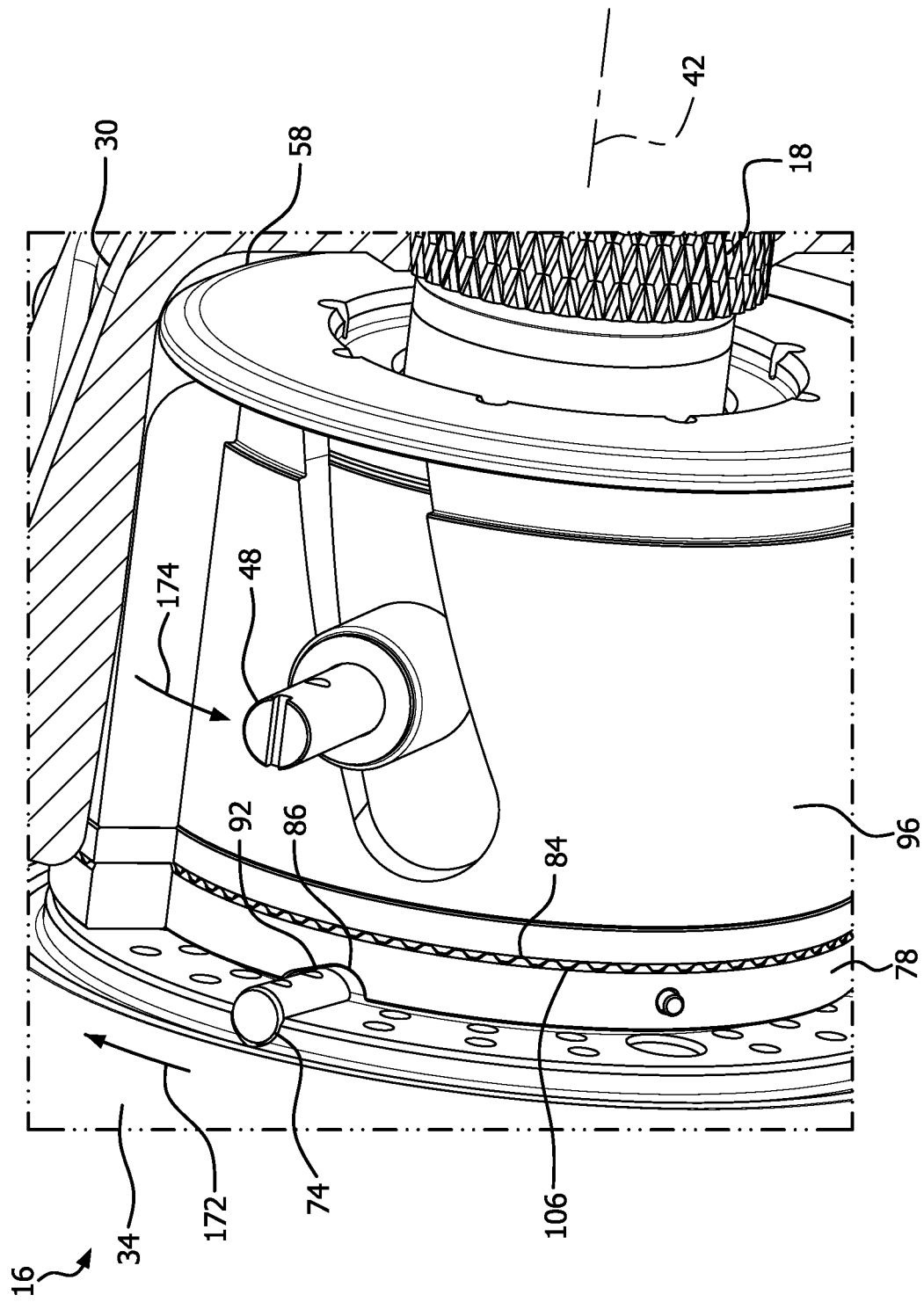
FIG. 26 is a detail perspective sectional view of the driven clutch in the engine braking mode of FIG. 25, with the driven shaft, the movable hub of the second sheave, the roller assemblies, the engine braking lock ring, and the engine braking helix not being sectioned.
Figure 27:
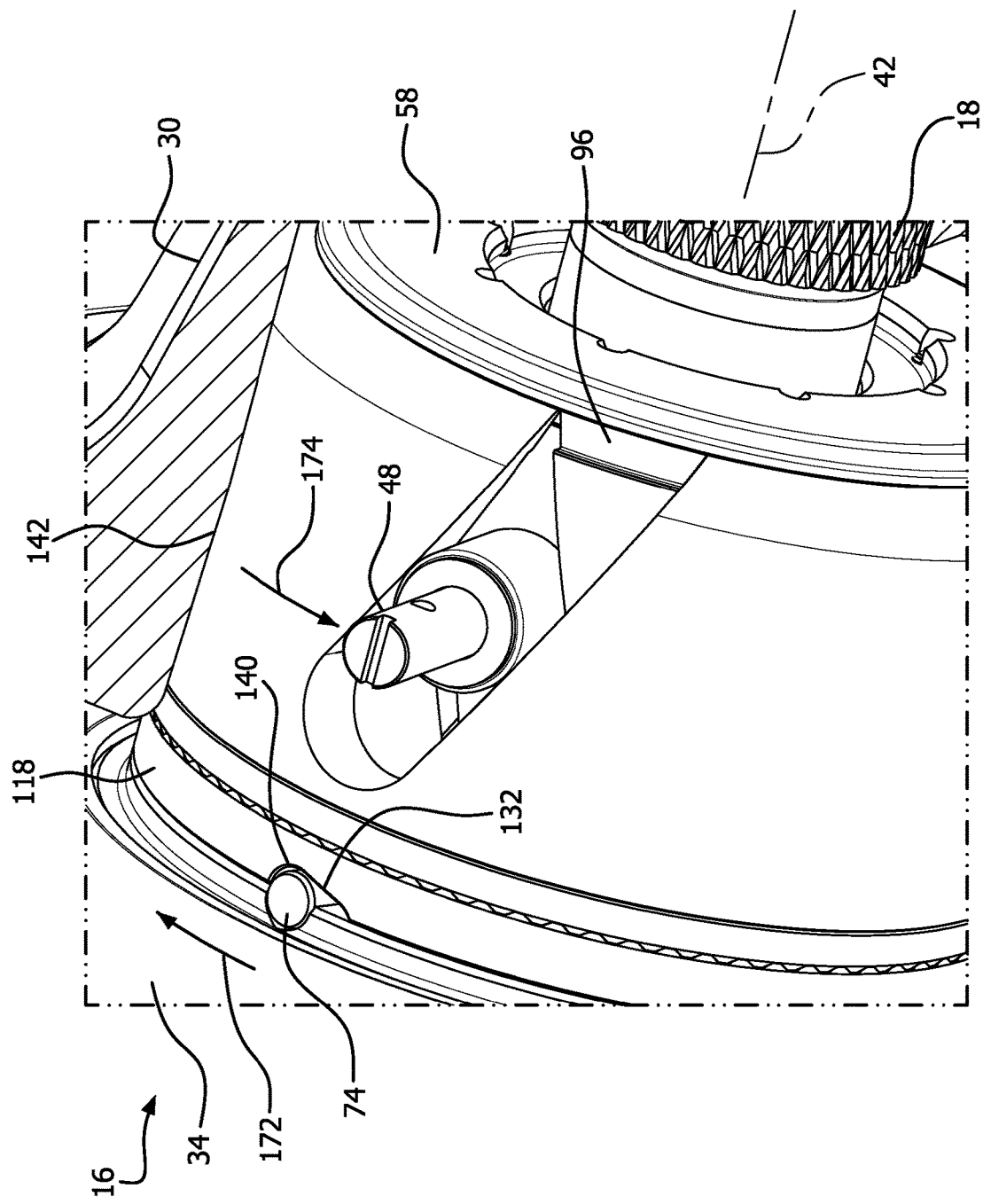
FIG. 27 is a detail perspective sectional view of the driven clutch in the engine braking mode of FIG. 25, with the driven shaft, the movable hub of the second sheave, the roller assemblies, the engine braking helix, the acceleration lock ring, and the acceleration helix not being sectioned

FIGS. 25-27 illustrate operation of the clutch 16 in an engine braking mode. More specifically and referring to FIG. 25, the shaft 18 applies torque 170 to the clutch 16 in the first direction and the belt 20 applies reaction torque 172 to the clutch 16 in the second, or engine braking, direction. In FIG. 26 the following components are not sectioned: the shaft 18, the second sheave 34 and its movable hub 58, the roller assemblies 48, the engine braking lock ring 78, and the engine braking helix 96. FIG. 27 is similar to FIG. 26, except that the acceleration lock ring 118 and acceleration helix 142 are not sectioned. In the engine braking mode, the torque 170 from the shaft 18 causes torque 174 to be applied to the roller assemblies 48 in the first direction. In addition, the springs 72 hold the engine braking lock ring 78 (FIG. 26) and the acceleration lock ring 118 in contact with the engine braking helix 96 and the acceleration helix 142, respectively.

With continued reference to FIGS. 26 and 27, in the engine braking mode the opposing torque between the second sheave 34 and the first sheave 30 and roller assemblies 48 causes the second sheave 34 to rotationally retard about the sheave axis 42 relative to the first sheave and roller assemblies 48. As shown specifically in FIG. 26, the second sheave 34 continues to rotationally retard relative to the first sheave 30 and the roller assemblies 48 until each of the drive protrusions 74 of the second sheave 34 contact, or wedge against, one of the grooves 86 (FIG. 26) of the engine braking lock ring 78, more specifically the relatively shallow portion 92 of one of the grooves 86. This contact holds the engine braking lock ring 78 and the engine braking helix 96 in meshing engagement, via the teeth 84, 106, that is, the teeth 84 interdigitate or mesh with the teeth 106. This action movably secures the second sheave 34 to the engine braking helix 96, and the engine braking helix 96 pushes the movable hub 58 and the remainder of the second sheave 34 toward the first sheave 30, thereby compressing the belt 20 between the first sheave 30 and the second sheave 34.

As specifically shown in FIG. 27, in the engine braking mode each drive protrusion 74 is positioned in the relatively deep portion 140 of one of the grooves 132 of the acceleration lock ring 118, due to the rotational coupling 120 (shown elsewhere) between the engine braking lock ring 78 (shown elsewhere) and the acceleration lock ring 118, the angular alignment of their grooves 86, 132, and the opposite orientation of the grooves 86, 132. As a result, the drive protrusions 74 do not contact the acceleration lock ring 118, the acceleration lock ring 118 remains in a "neutral" position, and the second sheave 34 is movably disconnected from the acceleration helix 142.

Embodiments of driven clutches according to the present invention may take various other forms. For example, in some embodiments driven clutches according to the present invention may be similar to the clutch 16 described above, except that the acceleration lock ring 118 and the acceleration helix 142 are disposed between the movable hub 58 and the engine braking lock ring 78 and the engine braking helix 96, respectively.

As used herein, the term "engage" is intended to both direct physical engagement through one or more components as well as operative engagement.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed. The various embodiments and elements can be interchanged or combined in any suitable manner as necessary.

The use of directions, such as forward, rearward, top and bottom, upper and lower are with reference to the embodiments shown in the drawings and, thus, should not be taken as restrictive. Reversing or flipping the embodiments in the drawings would, of course, result in consistent reversal or flipping of the terminology.

No language in the specification should be construed as indicating any non-claimed element as essential to the practice of the invention.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

What is claimed is:

1. A driven clutch for a continuously variable transmission comprising a belt, the driven clutch comprising:
a first sheave configured to rotate together with a shaft about a sheave axis;
a roller coupled to and being rotatable relative to the first sheave;
a second sheave coupled to the first sheave, the second sheave being translatable and rotatable relative to the first sheave;
an engine braking helix coupled to the second sheave, the engine braking helix comprising an engine braking ramp extending helically in a first ramp direction relative to the sheave axis;
an acceleration helix coupled to the second sheave and configured to be rotated relative to the engine braking helix, the acceleration helix comprising an acceleration ramp extending helically in a second ramp direction to the sheave axis, the second ramp direction being opposite the first ramp direction; and
wherein (1) when the belt applies torque to the first sheave and the second sheave in an acceleration direction, the acceleration helix is secured to and rotates together with the second sheave and the roller contacts the acceleration ramp to pinch the belt between the first sheave and the second sheave, and (2) when the belt applies torque to the first sheave and the second sheave in an engine braking direction opposite the acceleration direction, the engine braking helix is secured to and rotates together with the second sheave and the roller contacts the engine braking ramp to pinch the belt between the first sheave and the second sheave.

2. The driven clutch of claim 1, wherein (1) when the belt applies torque to the first sheave and the second sheave in the acceleration direction, the engine braking helix is rotatable relative to the second sheave, and (2) when the belt applies torque to the first sheave and the second sheave in the engine braking direction, the acceleration helix is rotatable relative to and the second sheave.

3. The driven clutch of claim 1, wherein the second sheave comprises a movable hub, the engine braking helix being disposed radially outwardly from the movable hub, and the acceleration helix being disposed radially outwardly from the engine braking helix.

4. The driven clutch of claim 1, further comprising an acceleration lock ring, and wherein when the belt applies torque to the first sheave and the second sheave in the acceleration direction the acceleration lock ring secures the acceleration helix to the second sheave.

5. The driven clutch of claim 4, wherein the acceleration lock ring comprises a first plurality of acceleration teeth, the acceleration helix comprises a second plurality of acceleration teeth, and wherein when the belt applies torque to the first sheave and the second sheave in the acceleration direction the first plurality of acceleration teeth interdigitate with the second plurality of acceleration teeth to secure the acceleration helix to the second sheave.

6. The driven clutch of claim 4, wherein the second sheave comprises at least one protrusion and the acceleration lock ring comprises at least one groove, and wherein when the belt applies torque to the first sheave and the second sheave in the acceleration direction the protrusion wedges against the acceleration lock ring in the groove to secure the acceleration helix to the second sheave.

7. The driven clutch of claim 4, further comprising at least one spring urging the acceleration lock ring to contact the acceleration helix.

8. The driven clutch of claim 4, further comprising an engine braking lock ring, wherein when the belt applies torque to the first sheave and the second sheave in the engine braking direction the engine braking lock ring secures the engine braking helix to the second sheave.

9. The driven clutch of claim 1, further comprising an engine braking lock ring, wherein when the belt applies torque to the first sheave and the second sheave in the engine braking direction the engine braking lock ring secures the engine braking helix to the second sheave.

10. The driven clutch of claim 9, wherein the engine braking lock ring comprises a first plurality of engine braking teeth, the engine braking helix comprises a second plurality of engine braking teeth, and wherein when the belt applies torque to the first sheave and the second sheave in the engine braking direction the first plurality of engine braking teeth interdigitate with the second plurality of engine braking teeth to secure the engine braking helix to the second sheave.

11. The driven clutch of claim 9, wherein the second sheave comprises at least one protrusion and the engine braking lock ring comprises at least one groove, and wherein when the belt applies torque to the first sheave and the second sheave in the engine braking direction the protrusion wedges against the engine braking lock ring in the groove to secure the engine braking helix to the second sheave.

12. The driven clutch of claim 9, further comprising at least one spring urging the engine braking lock ring to contact the engine braking helix.

13. A driven clutch for a continuously variable transmission, the driven clutch comprising:
a first sheave configured to rotate together with a shaft about a sheave axis;
a roller coupled to the first sheave, the roller being rotatable relative to the first sheave about a roller axis;
a second sheave coupled to the first sheave, the second sheave being translatable relative to the first sheave along the sheave axis, and the second sheave being rotatable relative to the first sheave about the sheave axis;
an engine braking helix coupled to the second sheave, the engine braking helix comprising an engine braking ramp extending helically in a first ramp direction relative to the sheave axis;

an acceleration helix coupled to the second sheave and configured to be rotated relative to the engine braking helix, the acceleration helix comprising an acceleration ramp extending helically in a second ramp direction relative to the sheave axis, the second ramp direction being opposite the first ramp direction; and
wherein (1) when torque is applied to the first sheave and the second sheave in an acceleration direction, the acceleration helix is secured to and rotates together with the second sheave and the roller contacts the acceleration ramp to urge the second sheave toward the first sheave, and (2) when torque is applied to the first sheave and the second sheave in an engine braking direction opposite the acceleration direction, the engine braking helix is secured to and rotates together with the second sheave and the roller contacts the engine braking ramp to urge the second sheave toward the first sheave.

14. The driven clutch of claim 13, wherein (1) when torque is applied to the first sheave and the second sheave in the acceleration direction, the engine braking helix is rotatable relative to the second sheave, and (2) when torque is applied to the first sheave and the second sheave in the engine braking direction, the acceleration helix is rotatable relative to the second sheave.

15. The driven clutch of claim 13, wherein the second sheave further comprises a movable hub, the engine braking helix being disposed radially outwardly from the movable hub, and the acceleration helix being disposed radially outwardly from the engine braking helix.

16. The driven clutch of claim 13, further comprising an acceleration lock ring, and wherein when torque is applied to the first sheave and the second sheave in the acceleration direction the acceleration lock ring secures the acceleration helix to the second sheave.

17. The driven clutch of claim 16, further comprising an engine braking lock ring, and wherein when torque is applied to the first sheave and the second sheave in the engine braking direction the engine braking lock ring secures the engine braking helix to the second sheave.

18. The driven clutch of claim 17, wherein the engine braking lock ring is rotatable together with the acceleration lock ring about the sheave axis.

19. The driven clutch of claim 13, further comprising an engine braking lock ring, and wherein when torque is applied to the first sheave and the second sheave in the engine braking direction the engine braking lock ring secures the engine braking helix to the second sheave.

20. A driven clutch for a continuously variable transmission, the driven clutch comprising:
a first sheave configured rotate together with a shaft about a sheave axis;
a second sheave coupled to the first sheave, the second sheave being translatable and rotatable relative to the first sheave;
a drive protrusion coupled to the second sheave;
a first helix coupled to the second sheave, the first helix comprising a first ramp extending helically in a first ramp direction relative to the sheave axis; and
a second helix coupled to the second sheave and configured to be rotated relative to the first helix, the second helix comprising a second ramp extending helically in a second ramp direction relative to the sheave axis, the second ramp direction being opposite the first ramp direction;
wherein (1) when torque is applied to the first sheave and the second sheave in a first torque direction, the drive protrusion secures the first helix to the second sheave and causes the first helix to rotate together with the second sheave, and the second helix is rotatable relative to the second sheave, and (2) when torque is applied to the first sheave and the second sheave in a second torque direction opposite the first torque direction, the drive protrusion secures the second helix to the second sheave and causes the second helix to rotate together with the second sheave, and the first helix is rotatable relative to the second sheave.

* * * * *